(12) United States Patent
Arimatsu

(10) Patent No.: US 10,103,589 B2
(45) Date of Patent: Oct. 16, 2018

(54) ROTOR MEMBER FIXED TO ROTARY SHAFT OF ELECTRICAL ROTATING MACHINE, ROTOR, ROTARY ELECTRIC MACHINE AND METHOD FOR DISASSEMBLING ROTOR

(71) Applicant: FANUC CORPORATION, Yamanashi (JP)

(72) Inventor: Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 14/737,570

(22) Filed: Jun. 12, 2015

(65) Prior Publication Data

US 2015/0364960 A1 Dec. 17, 2015

(30) Foreign Application Priority Data

Jun. 16, 2014 (JP) .................. 2014-123733

(51) Int. Cl.
*H02K 1/28* (2006.01)
*H02K 1/27* (2006.01)
*H02K 15/00* (2006.01)

(52) U.S. Cl.
CPC .............. *H02K 1/278* (2013.01); *H02K 1/28* (2013.01); *H02K 15/0006* (2013.01); *Y10T 29/49014* (2015.01)

(58) Field of Classification Search
CPC .... H02K 1/2726; H02K 1/2733; H02K 1/278; H02K 1/28; H02K 1/30
See application file for complete search history.

(56) References Cited

FOREIGN PATENT DOCUMENTS

| CN | 102842977 A | 12/2012 |
|---|---|---|
| CN | 205283281 U | 6/2016 |
| DE | 112007000139 T5 | 11/2008 |
| JP | 6377442 U | 5/1988 |
| JP | 1189142 A | 3/1999 |
| JP | 2000245086 A | 9/2000 |
| JP | 2001169485 A | 6/2001 |
| JP | 2004173341 A | 6/2004 |
| JP | 2010239800 A | 10/2010 |
| JP | 2011125106 A | 6/2011 |
| JP | 2011125212 A | 6/2011 |

OTHER PUBLICATIONS

English Abstract and Machine Translation for Japanese Publication No. 2011-125106 A published Jun. 23, 2011, 15 pgs.

(Continued)

*Primary Examiner* — Ramon M Barrera
(74) *Attorney, Agent, or Firm* — Fredrikson & Byron, P.A.

(57) ABSTRACT

Provided is a rotor member that can contribute to an easy assembling operation and components thereof can be reused. The rotor member includes a magnet mounting member having a first end and a second end, a plurality of magnets arranged radially outwardly of the magnet mounting member, and a tubular holding member arranged radially outwardly of the plurality of magnets and holds the magnets between the holding member and the magnet mounting member. The magnet mounting member includes a slit that radially penetrates the magnet mounting member and extends in a predetermined axial-direction section.

8 Claims, 32 Drawing Sheets

(56) References Cited

OTHER PUBLICATIONS

English Abstract and Machine Translation for Japanese Publication No. 2004-173341 A published Jun. 17, 2004, 8 pgs.
English Abstract and Machine Translation for Japanese Publication No. 2000-245086 A published Sep. 8, 2000, 8 pgs.
English Abstract and Machine Translation for Japanese Publication No. 63-0077442 U, published May 23, 1988, 3 pgs.
English Abstract and machine translation for Japanese Publication No. 11-089142 published Mar. 30, 1999, 15 pgs.
English Abstract and Machine Translation for Japanese Publication No. 2011-125212 A, published Jun. 23, 2011, 17 pgs.
English Abstract and Machine Translation for Japanese Publication No. 2010-239800 A, published Oct. 21, 2010, 10 pgs.
English Abstract and Machine Translation for Japanese Publication No. 2001-169485 A, published Jun. 22, 2001, 11 pgs.
English Abstract and Machine Translation for German Publication No. 112007000139 T5, published Nov. 13, 2008, 10 pgs.
English Abstract for Chinese Publication No. 102842977 A, published Dec. 26, 2012, 13 pgs.
English Abstract for Chinese Publication No. 205283281 U, published Jun. 1, 2016, 17 pgs.

ROTOR MEMBER FIXED TO ROTARY SHAFT OF ELECTRICAL ROTATING MACHINE, ROTOR, ROTARY ELECTRIC MACHINE AND METHOD FOR DISASSEMBLING ROTOR

FIELD OF THE INVENTION

1. Technical Field

The invention relates to a rotor member fixed to a rotary shaft of a rotary electric machine, a rotor, and a rotary electric machine. The invention also relates to a method for disassembling a rotor.

2. Description of Related Art

A synchronous motor includes a rotor, a rotary shaft included in the rotor, and magnets arranged radially outwardly of the rotary shaft. The magnets have to be fixed firmly to the rotary shaft by a reinforcing arrangement so that the magnets can withstand against centrifugal force to be applied to the magnets during a rotation of the synchronous motor. In general, there is provided a reinforcing structure such as a tubular holding member that is composed of carbon fiber or titanium, for example, and is adapted to cover the magnets. Japanese Laid-open Patent Application Publication No. H11-89142, for example, discloses a synchronous motor involving a high speed rotation, in which magnets each having a ring-like shape are used and the magnets are reinforced at outer circumferences thereof with carbon fiber reinforced plastic (CFRP).

The synchronous motor involving a high speed rotation disclosed in Japanese Laid-open Patent Application Publication No. H11-89142 uses a tubular sleeve that is provided with a sufficiently large interference or fastening margin and is shrink-fitted or interference-fitted over a rotary shaft so that the sleeve does not loosen with respect to the rotary shaft in a high rotation speed operation. Magnets are arranged on an outer circumference of the sleeve, and a holding member is shrink- or interference-fitted over the magnets so as to push the magnets and the sleeve against the rotary shaft to thereby press hold the magnets and the sleeve. The motor disclosed in Japanese Laid-open Patent Application Publication No. H11-89142 provided with the structure described above can achieve a high rotation speed operation.

The rotor disclosed in Japanese Laid-open Patent Application Publication No. H11-89142 is configured to achieve a primary object of being operated in a high rotation speed, and thus the rotor requires a tight shrink-fitting or interference-fitting by a large fastening margin or interference. Thus, the rotor disclosed in the Publication is not considered to be disassembled, once it is assembled. Accordingly, the rotor disclosed in the Publication is not easy to disassemble, and magnets and a sleeve of the rotor may be damaged while the rotor is disassembled with excessive force that is used against firmly shrink- or interference-fitted rotor. This can result in reuse of the rotor, magnets and sleeve.

Some electric motors are used to primarily provide large torque, in which a high rotational speed operation is unneeded, rather than providing improved high rotational speed. A most effective means to improve torque of an electric motor is to increase a dimension of the electric motor, such as an increase of a diameter thereof and/or an increase of a total length thereof. The rotor disclosed in Japanese Laid-open Patent Application Publication No. H11-89142 requires greater force in expanding the sleeve radially outwardly when the rotor is assembled, as the rotor is provided with a larger diameter and a longer total length.

A rotor having a diameter larger than a predetermined length requires an extremely large force when it is assembled, which may result in an unsuccessful assembly of the rotor. In other words, a rotor having the configuration disclosed in Japanese Laid-open Patent Application Publication No. H11-89142 and having a diameter greater than a predetermined length cannot be manufactured successfully, in some cases.

There is an increased demand to reuse members of a rotor, such as magnets, because of an increased cost of a material for the magnets to be used in a rotor, besides a reason that a rotor does not necessarily require a high rotational speed. In particular, a rare earth magnet such as a neodymium magnet has been increased in cost, and it is difficult to get a raw material of the rare earth magnet. Thus, reuse of such a magnet has been highly preferable. Unfortunately, it is difficult to disassemble a rotor having a structure disclosed in Japanese Laid-open Patent Application Publication No. H11-89142, and thus collection and reuse of members of such a rotor cannot be carried out.

SUMMARY OF INVENTION

According to one aspect of the invention, a rotor member fixed to a rotary shaft of a rotary electric machine comprises a magnet mounting member having a first end at an axially first side and a second end at an axially second side; a plurality of magnets arranged radially outside of the magnet mounting member; and a tubular holding member arranged radially outside of the plurality of magnets so as to surround the plurality of magnets. The magnet mounting member includes a slit extending through the magnet mounting member in the radial direction. The slit extends over a predetermined axial-direction section. The axial-direction section includes at least one of the first end and the second end. The magnet mounting member may be made of a magnetic material.

The slit may be arranged at a position between the magnets which adjoin each other in the circumferential direction. The plurality of magnets may be arranged within the axial-direction section. The magnet mounting member may include a tapered inner periphery that continuously expands radially outward as extending from the axially first side to the axially second side.

The rotor member may be further provided with a wedge member arranged radially inside of the magnet mounting member. The magnet mounting member may include a cylindrical inner periphery having an inner diameter which is constant in the axial direction. The wedge member may include a tapered inner periphery that continuously expands radially outward as extending from the axially first side to the axially second side.

A plurality of the slits may be arranged in the circumferential direction. The slit may extend over the axial-direction section which includes the second end and which excludes the first end. The magnet mounting member may include a first slit extending over the axial-direction section which includes the second end and which excludes the first end; and a second slit provided to adjoin the first slit in the circumferential direction, and extending over the axial-direction section which includes the first end and which excludes the second end. The slit may extend over the entire axial-direction section ranging from the first end to the second end. The inner periphery of the magnet mounting member may include a flat surface.

The holding member may include fiber selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers. The holding member may include fiber-reinforced resin with fiber selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers.

According to another aspect of the invention, a rotor comprises a rotary shaft and the rotor member described above. The rotary shaft includes a tapered outer circumferential surface which continuously expands radially outward as extending from the axially first side to the axially second side within an axial-direction section where the rotor member is fixed. The magnet mounting member is arranged at the outer periphery of the rotary shaft. The magnet mounting member and the plurality of magnets are pressed radially outward by the rotary shaft, and are held between the rotary shaft and the holding member by the action of an elastic restoring force toward radially inside which is generated at the holding member.

The slits may include a gap having a predetermined width in the circumferential direction. The rotary shaft may include a projection which projects out from the outer periphery of the rotary shaft to radially outside and which extends in the axial direction. The projection may be received in the gap so as to engage the gap so that the movement of the magnet mounting member in the circumferential direction relative to the outer periphery of the rotary shaft is prevented.

According to still another aspect of the invention, a rotary electric machine comprises the rotor described above. According to still another aspect of the invention, a method of disassembling a rotor comprises steps of cutting the holding member along the axial direction at a position between the magnets which adjoin each other in the circumferential direction; and pushing a second end of the magnet mounting member toward the axially first side of the rotary shaft, and removing the magnet mounting member from the rotary shaft. The step of cutting the holding member may include a step of cutting a part of the holding member along the axial direction, and making the cut on the holding member to progress over the entire section in the axial direction of the holding member by the action of a tensile strength generated in the holding member.

BRIEF DESCRIPTION OF DRAWINGS

The invention will be clearly understood in its objects, characteristics and advantageous effects by the description of the preferred embodiments described hereinafter with the attached drawings, wherein.

DESCRIPTION OF EMBODIMENTS

Embodiments of the invention will be described in detail with reference to the drawings. First, referring to FIGS. 1 to 6, a rotor member 10 according to an embodiment of the invention will be described. Note that, in the following description, the axial direction indicates the direction along the axis O in the Figures. In addition, for clarity of description, the frontward in the axial direction (axially frontward) corresponds to the leftward in FIG. 2, while the rightward in FIG. 2 corresponds to the rearward in the axial direction (axially rearward).

However, it should be noted that the axially frontward and the axially rearward in the following description are conveniently given in view of easy understanding, and they do not specifically restrict directions of a rotor member and an electric motor, such as front and rear directions thereof. In addition, the radial direction in the following description indicates the direction of the radius of a circle centered about the axis O, while the circumferential direction in the following description indicates the circumferential direction of the circle centered about the axis O.

Figure 1:
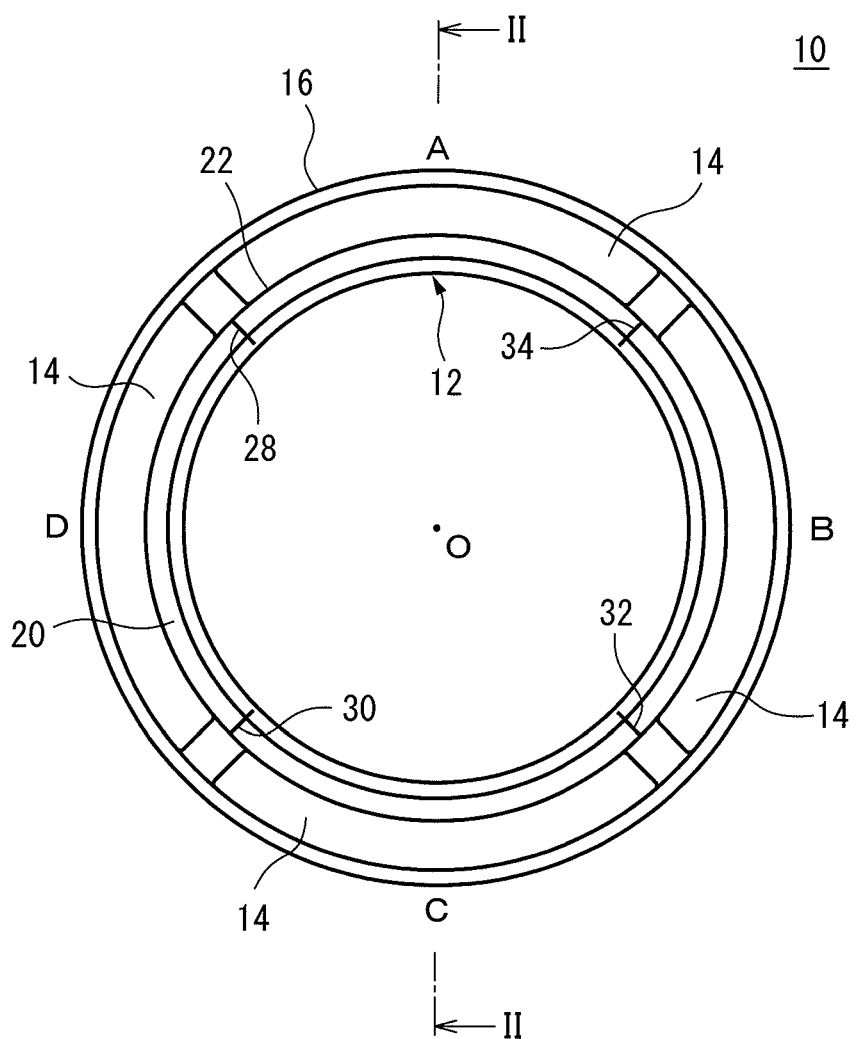
FIG. 1 is an appearance view of a rotor member according to an embodiment of the invention seen from the front in the axial direction.
Figure 2:
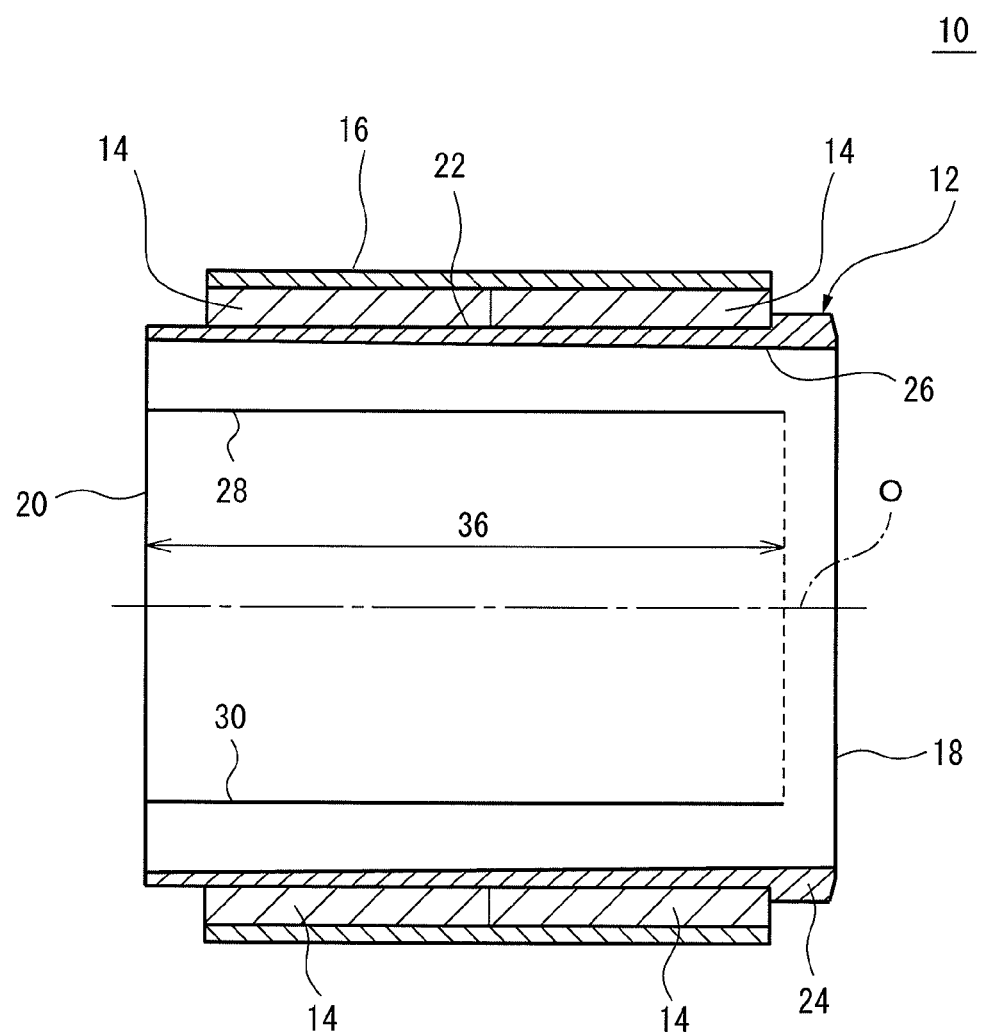
FIG. 2 is a cross sectional view of the rotor member shown in FIG. 1 cut along line II-II in FIG. 1.

As shown in FIGS. 1 and 2, a rotor member 10 includes a magnet mounting member 12; a plurality of magnets 14 arranged in the circumferential direction at radially outside of the magnet mounting member 12; and a tubular holding member 16 arranged radially outside of the magnets 14. The magnet 14 may be separated in the axial direction depending on the efficiency of manufacturing or shaping the magnet 14. As shown in FIG. 2, in the present embodiment, two of the magnets 14 which are separated from each other are arranged to align in the axial direction.

Figure 3:
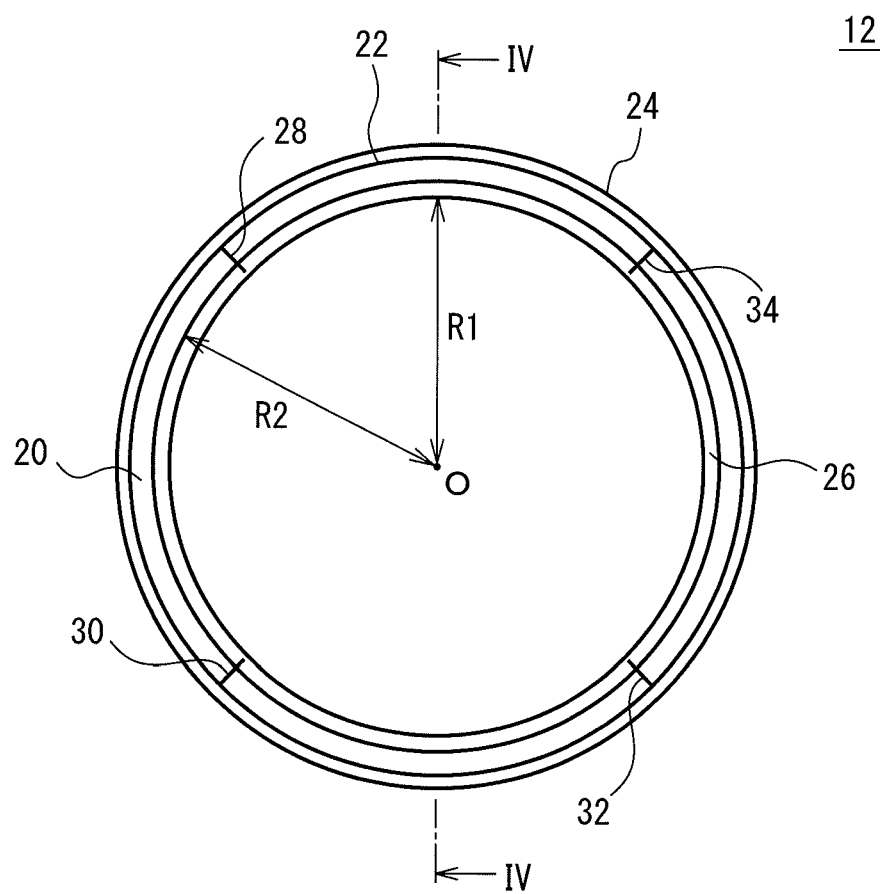
FIG. 3 is an appearance view of the magnet mounting member shown in FIG. 1 when seen from the front in the axial direction.
Figure 4:
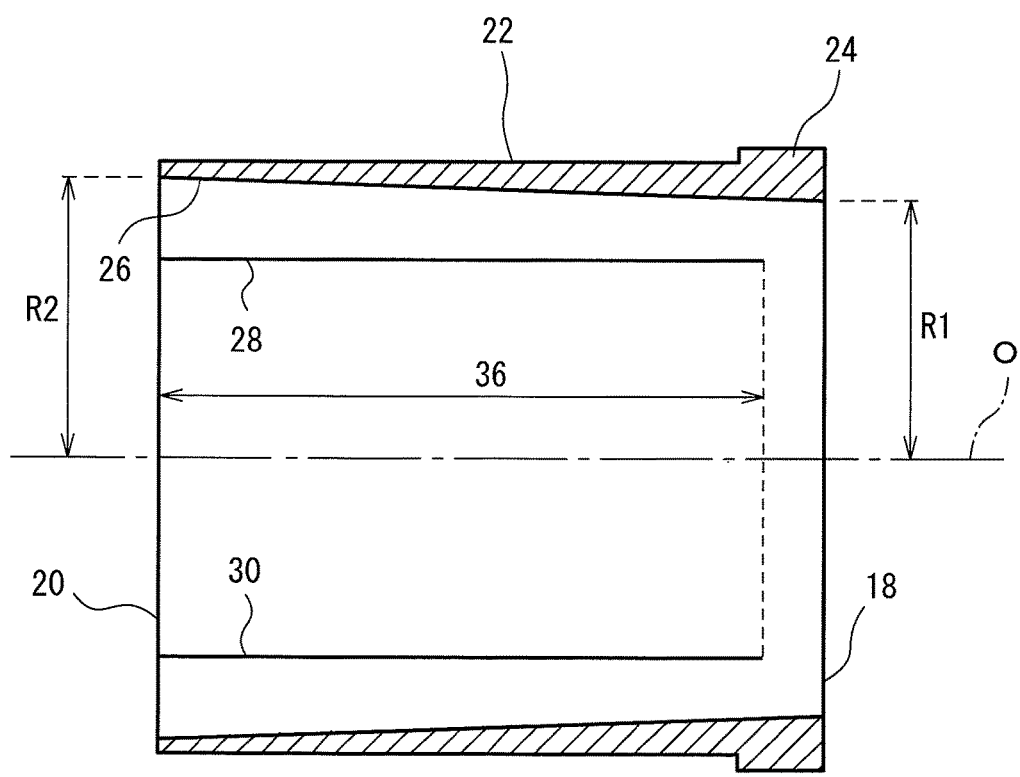
FIG. 4 is a cross sectional view of the magnet mounting member shown in FIG. 3 cut along line IV-IV in FIG. 3.

As shown in FIGS. 3 and 4, the magnet mounting member 12 is a tubular member having an axis O. The magnet mounting member 12 has a first end 18 at the axially rear side (the axially first side); a second end 20 at the axially front side (the axially second side); and a cylindrical outer periphery 22 extending along the axial direction. The magnet mounting member 12 is provided with a projection 24 arranged at the axially rear end of the member 12 so as to project radially outward from the outer periphery 22 of the member 12. The projection 24 is an example of an element to be used for matching the axial positions of the magnets 14 with each other during a manufacturing process.

The magnet mounting member 12 is made of a magnetic metal material, such as SS400 and S45C. The magnet mounting member 12 includes a tapered inner periphery 26 which continuously expands radially outward as extending from the first end 18 to the second end 20. In the present embodiment, the inner periphery 26 has an inner diameter which becomes larger the further toward the axially frontward over the entire section in the axial direction from the first end 18 to the second end 20.

The inner periphery 26 may be a linearly tapered surface. In this case, a radius of the inner periphery 26 linearly increases from a radius R1 at the first end 18 to a radius R2 at the second end 20. The taper ratio of the inner periphery 26 in this case may range from 1/200 to 1/30, for example.

On the other hand, the outer periphery 22 of the magnet mounting member 12 is a cylindrical surface having an outer diameter which is constant in the axial direction. Accordingly, the magnet mounting member 12 has a thickness in the radial direction which gradually decreases from the first end 18 to the second end 20.

The magnet mounting member 12 is formed with a total of four slits 28, 30, 32 and 34. Each of the slits 28, 30, 32 and 34 is formed so as to extend through the magnet mounting member 12 from the inner periphery 26 to the outer periphery 22 of the magnet mounting member 12. Thus, the magnet mounting member 12 is divided in the circumferential direction at the slits 28, 30, 32 and 34. Each of the slits 28, 30, 32 and 34 is defined by two wall surfaces contacting each other in the circumferential direction, and extends over the axial-direction section 36 shown in FIG. 4. Note that, the slits 28, 30, 32 and 34 may be defined so as to have a predetermined width in the circumferential direction.

The axial-direction section 36 is a section along the axial direction which includes the second end 20 and which excludes the first end 18. In other words, the slits 28, 30, 32 and 34 extend from the second end 20 axially rearward, and terminate at a position separated from the first end 18 toward axially frontward by a predetermined distance.

In the present embodiment, the slits 28, 30, 32 and 34 are arranged in the circumferential direction at regular intervals (i.e., about 90°). The magnet mounting member 12 is divided in the circumferential direction at the slits 28, 30, 32 and 34. The function of the slits 28, 30, 32 and 34 will be described later.

Figure 5:
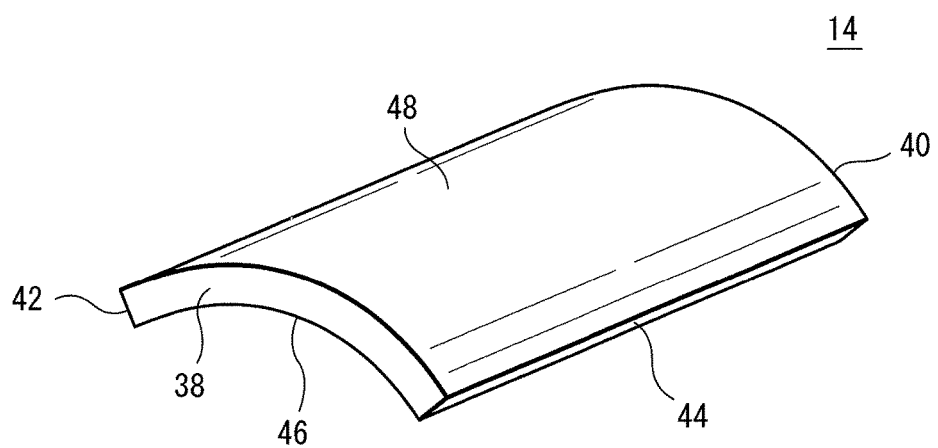
FIG. 5 is a perspective view of one of the magnets shown in FIG. 1.

As shown in FIG. 5, each of the magnets 14 is a circular arc member including an axially front end surface 38; an axially rear end surface 40; first and second end surfaces 42 and 44 in the circumferential direction, an inner periphery 46 and an outer periphery 48. The inner periphery 46 of the magnet 14 is a circular arc shaped surface having an inner diameter of a predetermined curvature radius. On the other hand, the outer periphery 48 of the magnet 14 may be any of a curved surface or a combination of curved surfaces having different curvature radii.

Note that, in FIG. 5, the end surfaces 42, 44, 46 and 48 are clearly depicted; however, each of them may be a curved surface or a very small surface, depending on a design of a magnetic circuit or on a specification of an electric motor. Therefore, it should be noted that they might not be clearly defined in some actual cases. It should also be noted that edges defining each surface are actually chamfered or smoothly curved, and therefore they might not be clearly defined.

Figure 6:
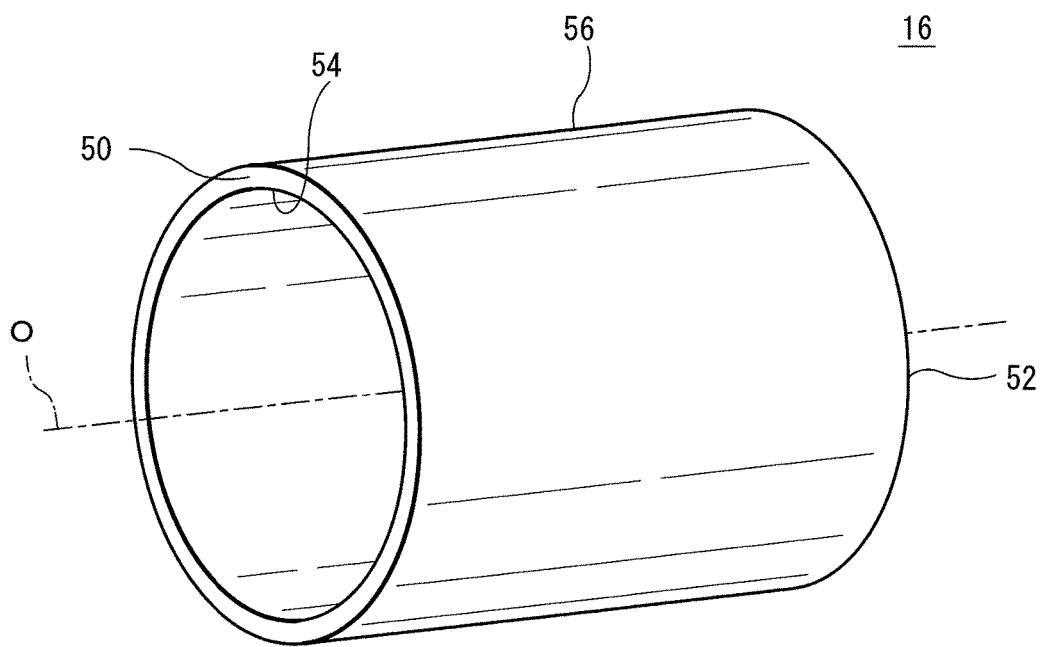
FIG. 6 is a perspective view of the holding member shown in FIG. 1.

As shown in FIG. 6, the holding member 16 is a tubular member having an axis O. Specifically, the holding member 16 includes an axially front end surface 50; an axially rear end surface 52; an inner periphery 54 and an outer periphery 56. Note that, the end surfaces 50, 52 is clearly depicted in FIG. 6 in view of easy understanding; however, they might not be clearly defined depending on material or structure of the holding member 16, or on a method of manufacturing the holding member 16.

The holding member 16 has high strength against the deformation to distend radially outward. In other words, the holding member 16 has a radius which does not easily change. The holding member 16 is preferably made of a non-magnetic material in order to prevent the heat generation derived from the magnetic flux and the deterioration of performance caused by leakage of the magnetic flux. In addition, the holding member 16 preferably has small density in order to reduce centrifugal force generated by rotation of the holding member 16.

As material for the holding member 16, fiber selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers can be used. Alternatively, as material for the holding member 16, fiber-reinforced resin selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers can be used.

Referring to FIGS. 1 and 2 again, in the rotor member 10 according to the present embodiment, a total of eight magnets 14 is arranged. Specifically, a pair of two magnets 14 which are arranged to adjoin in the axial direction as shown in FIG. 2 is placed at the circumferential position A in FIG. 1. Similarly, pairs of two magnets 14 arranged to adjoin in the axial direction are placed at the circumferential positions B, C and D in FIG. 4.

Thus, four pairs of magnets 14 are arranged in the circumferential direction at regular intervals on the outer periphery 22 of the magnet mounting member 12. Magnets 14 placed at axially rear side are positioned so that the axial positions thereof match each other by providing a structure such as the projection 24 at the magnet mounting member 12, for example. The holding member 16 is arranged radially outside of the magnets 14 so as to surround all of the magnets 14 from radially outside thereof.

The magnet 14 may be fixed to the outer periphery 22 of the magnet mounting member 12 by an adhesive. In this case, the magnet 14 is preferably adhered so that it can be removed from the outer periphery 22 of the magnet mounting member 12 with relatively small force, for easy disassembly of the rotor member 10. The operation of disassembling the rotor member 10 will be described later.

It is possible to prevent the relative movement of the magnet 14 and the magnet mounting member 12 during the operation of the rotor member 10, by fixing the magnet 14 and the magnet mounting member 12 to each other. On the other hand, if the magnet 14 is arranged on the outer periphery 22 of the magnet mounting member 12 without adhesive, a movement-restriction element for restricting the relative movement of the magnet 14 and the magnet mounting member 12 may be provided therebetween.

As the above movement-restriction element, a projection or recess may be formed on at least one of the outer periphery 22 of the magnet mounting member 12 and the inner periphery 46 of the magnet 14. Alternatively, a structure for increasing a friction coefficient, such as a high friction resin coating layer, an adhesive resin coating layer, a sand blasted surface, a coating layer containing a high friction coefficient material, and a chemically processed surface having a high friction coefficient, may be formed on at least one of the outer periphery 22 of the magnet mounting member 12 and the inner periphery 46 of the magnet 14. Alternatively, a friction-enhancing sheet having a surface on which a process for increasing a friction coefficient is performed, an adhesive sheet having a surface on which an adhesive is coated, or a tacky sheet such as an NBR or silicone rubber sheet may be interposed between the magnet mounting member 12 and the magnet 14.

Each of the slits 28, 30, 32 and 34 is arranged at a position between the magnets 14 which adjoin each other in the circumferential direction. Specifically, the slit 28 is arranged at a position between the pair of magnets 14 arranged at the circumferential position A and the pair of magnets 14 arranged at the circumferential position D.

Similarly, the slit 30 is arranged at a position between the pair of magnets 14 arranged at the circumferential position D and the pair of magnets 14 arranged at the circumferential position C. The slit 32 is arranged at a position between the pair of magnets 14 arranged at the circumferential position C and the pair of magnets 14 arranged at the circumferential position B. The slit 34 is arranged at a position between the pair of magnets 14 arranged at the circumferential position A and the pair of magnets 14 arranged at the circumferential position B.

As shown in FIG. 2, all of the magnets 14 are arranged within the axial-direction section 36. More specifically, the axially front end surfaces 38 of the magnets 14 placed at axially front side are positioned so as to be separated from the second end 20 toward axially rearward, while the axially rear end surfaces 40 of the magnets 14 placed at axially rear side are positioned so as to be separated from the rear ends of the slits 28, 30, 32 and 34 toward axially frontward.

Next, referring to FIGS. 7 and 8a, a magnet mounting member 62 according to another embodiment of the invention will be described. The magnet mounting member 62 can be applied to the rotor member 10 shown in FIGS. 1 and 2, instead of the above-mentioned magnet mounting member 12. The magnet mounting member 62 is a tubular member having an axis O. The member 62 includes a first end 63 at axially rear side; a second end 64 at axially front side; a cylindrical outer periphery 66 extending in the axial direction; and a tapered inner periphery 68 continuously expanding radially outward as extending from the first end 63 to the second end 64. A projection 70 projecting radially outward from the outer periphery 66 of the member 62 is formed at the axially end of the outer periphery 66. Similar to the above-mentioned projection 24, the projection 70 is an example of an element for facilitating match of the axial positions of the magnets 14 with each other during a manufacturing process.

The magnet mounting member 62 is provided with a total of four slits 72, 74, 76 and 78. Each of the slits 72, 74, 76 and 78 is formed to extend through the magnet mounting member 62 in the radial direction from the inner periphery 68 to the outer periphery 66 of the magnet mounting member 62. The slits 72, 74, 76 and 78 extend over an axial-direction section 80 of the magnet mounting member 62. The axial-direction section 80 is a section along the axial direction which includes the second end 64 and which excludes the first end 63.

Specifically, the slit 72 includes a gap 72a extending from the second end 64 toward axially rearward, and a substantially circular hole 72b formed at the axially rear end of the gap 72a. The gap 72a has a predetermined width in the circumferential direction. The gap 72a is defined by two walls facing each other in the circumferential direction so as to be separated from each other by a predetermined distance therebetween. The hole 72b is formed to have a diameter larger than the width in the circumferential direction of the gap 72a.

Similarly, the slits 74, 76 and 78 respectively include gaps 74a, 76a and 78a extending from the second end 64 toward axially rear ward, and holes 74b, 76b and 78b formed at the axially rear ends of the gaps 74a, 76a and 78a. The axial-direction section 80 in the present embodiment ranges from the second end 64 to the axially rear ends of the holes 72b, 74b, 76b and 78b.

When applying the magnet mounting member 62 to the rotor member 10 shown in FIG. 1, the magnets 14 are arranged on the outer periphery 66 of the magnet mounting member 62 so as to be within the axial-direction section 80. In addition, each of the slits 72, 74, 76 and 78 is positioned between two magnets 14 adjoining each other in the circumferential direction.

Next, referring to FIGS. 9 and 10A, a rotor member 300 according to another embodiment of the invention will be described. Note that, same reference numerals are assigned to elements similar to the above-mentioned embodiments, and detailed description thereof will be omitted. The rotor member 300 includes a magnet mounting member 302; a plurality of magnets 304 arranged radially outside of the magnet mounting member 302 so as to line in the circumferential direction; and a tubular holding member 16 arranged radially outside of the magnets 304.

The magnet mounting member 302 is a tubular member having an axis O. The magnet mounting member 302 includes a first end 306 at axially rear side; a second end 308 at axially front side; a cylindrical outer periphery 310 extending in the axial direction; and a tapered inner periphery 312 continuously expanding radially outward as extending from the first end 306 to the second end 308.

The magnet mounting member 302 in formed with a total of eight slits 314, 316, 318, 320, 322, 324, 326 and 328. The slits 314, 316, 318, 320, 322, 324, 326 and 328 extend through the magnet mounting member 302 from the inner periphery 312 to the outer periphery 310 of the magnet mounting member 302.

The slits 314, 316, 318, 320, 322, 324, 326 and 328 are arranged so as to line up in the circumferential direction at regular intervals (i.e., about 45°). The magnet mounting member 302 is divided in the circumferential direction at the slits 314, 316, 318, 320, 322, 324, 326 and 328.

Figure 10:
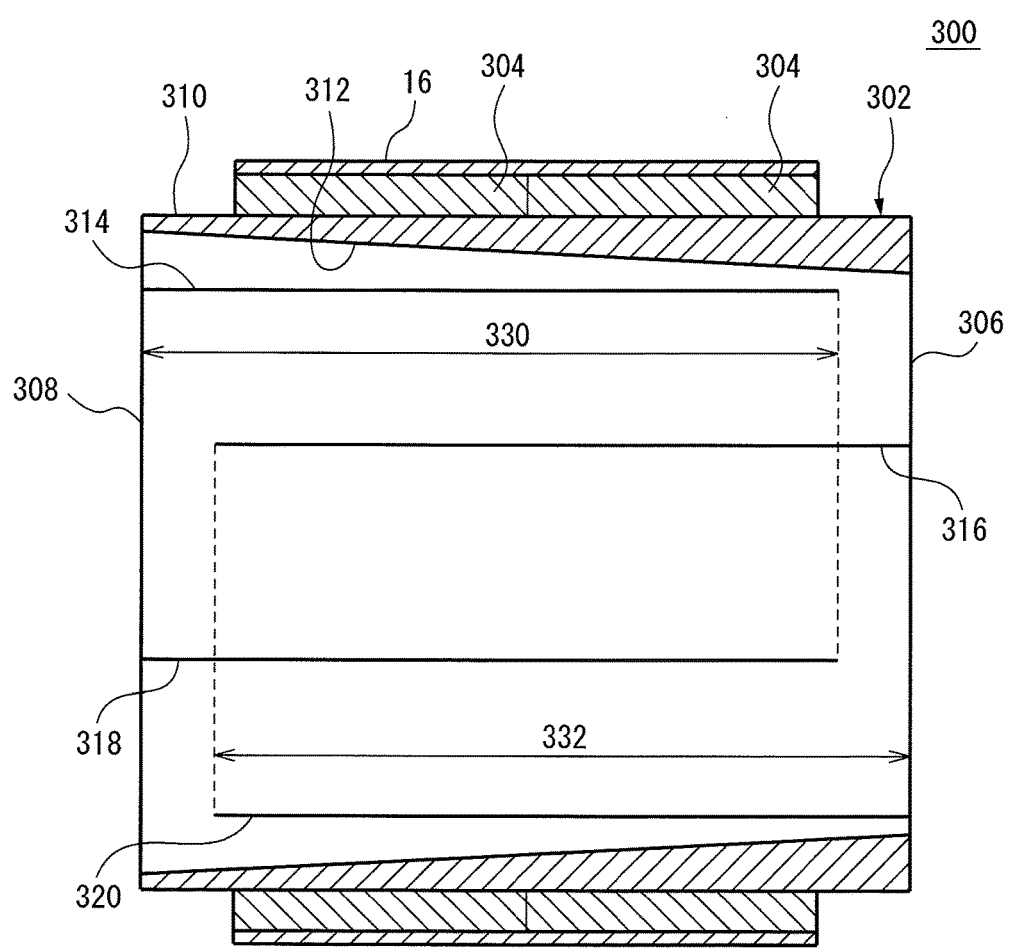
FIG. 10 is a cross sectional view of the rotor member shown in FIG. 9 cut along line X-X in FIG. 9.

As shown in FIG. 10, the slits 314 and 318 extend over an axial-direction section 330. The axial-direction section 330 is a section along the axial direction, which includes the second end 308 while excluding the first end 306. In other words, the slits 314 and 318 extend from the second end 308 toward axially rearward, and terminate at a position separated from the first end 306 toward axially frontward by a predetermined distance.

Similar to the slits 314 and 318, the slits 322 and 326 extend over the axial-direction section 330. Thus, the slits 314, 318, 322 and 326 constitute a first slit extending over the axial-direction section 330.

On the other hand, as shown in FIG. 10, the slits 316 and 320, which respectively adjoin the slits 314 and 318 in the circumferential direction, extend over an axial-direction section 332. The axial-direction section 332 is a section along the axial direction which includes the first end 306 and which excludes the second end 308. In other words, the slits 316 and 320 extend from the first end 306 toward axially frontward, and terminate at a position separated from the second end 308 toward axially rearward by a predetermined distance.

Similar to the slits 316 and 320, the slits 324 and 328, which respectively adjoin the slits 322 and 326, extend over the axial-direction section 332. Thus, the slits 316, 320, 324 and 328 constitute a second slit which adjoins the first slit and which extends over the axial-direction section 332.

In the present embodiment, a total of sixteen magnets 304 are arranged. Specifically, at each of the circumferential positions O, P, Q, R, S, T, U, and V shown in FIG. 9, a pair of two magnets 304 arranged to axially adjoin each other as shown in FIG. 10. Each of the slits 314, 316, 318, 320, 322, 324, 326 and 328 formed at the magnet mounting member 302 is arranged at a position between the magnets 304 adjoining each other in the circumferential direction.

Next, referring to FIGS. 11 and 12A, a magnet mounting member 82 according to still another embodiment of the invention will be described. The magnet mounting member 82 can be applied to the rotor member 10 shown in FIGS. 1 and 2, instead of the above magnet mounting member 12. The magnet mounting member 82 includes a first end 84 at axially rear side; a second end 86 at axially front side; a cylindrical outer periphery 85 extending in the axial direction; and a tapered inner periphery 87 continuously expanding radially outward as extending from the first end 84 to the second end 86.

The magnet mounting member 82 according to the present embodiment includes slits 88, 90, 92 and 94 formed at four positions. In the present embodiment, the slits 88, 90, 92 and 94 extend over the entire axial-direction section of the magnet mounting member 82 ranging from the first end 84 to the second end 86. In other words, the magnet mounting member 82 is divided at the slits 88, 90, 92 and 94 into four pieces, thereby the magnet mounting member 82 is constituted by a total of four segments 96 arranged in the circumferential direction.

Figure 13:
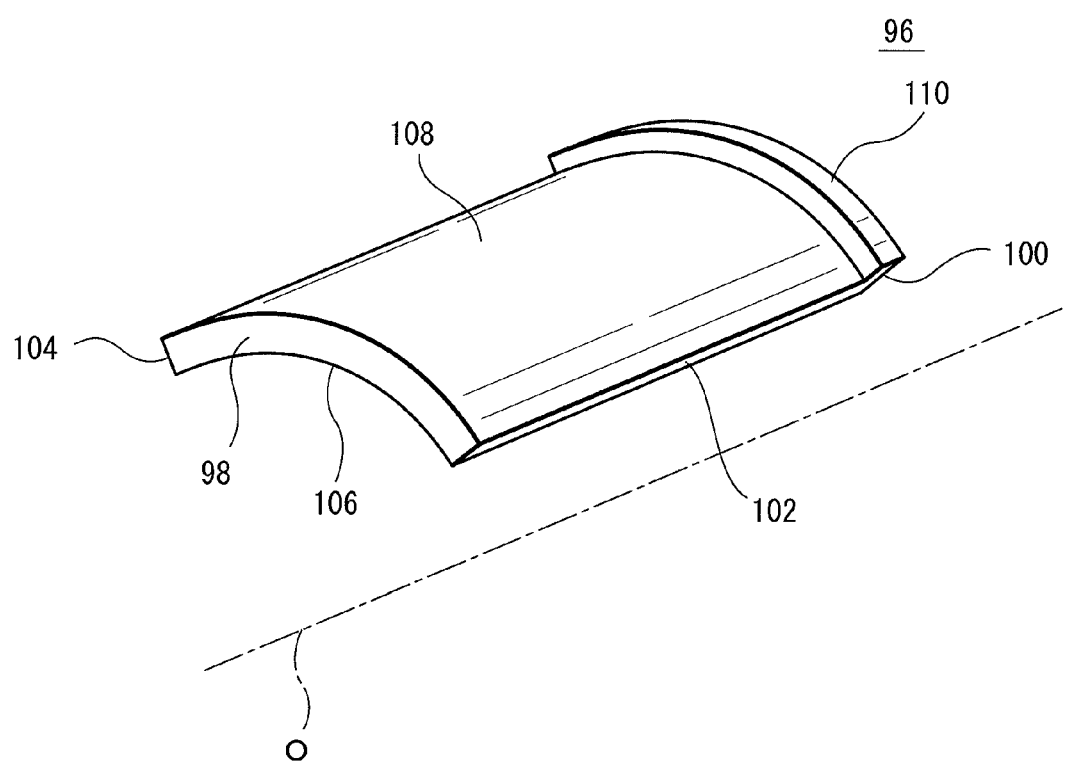
FIG. 13 is a perspective view of one segment of the magnet mounting member shown in FIG. 11.

Referring to FIG. 13, one of the segments 96 which constitute the magnet mounting member 82 will be described. The segment 96 includes an axially front end 98; an axially rear end 100; end surfaces 102 and 104 in the circumferential direction; an inner periphery 106 and an outer periphery 108.

Figure 12:
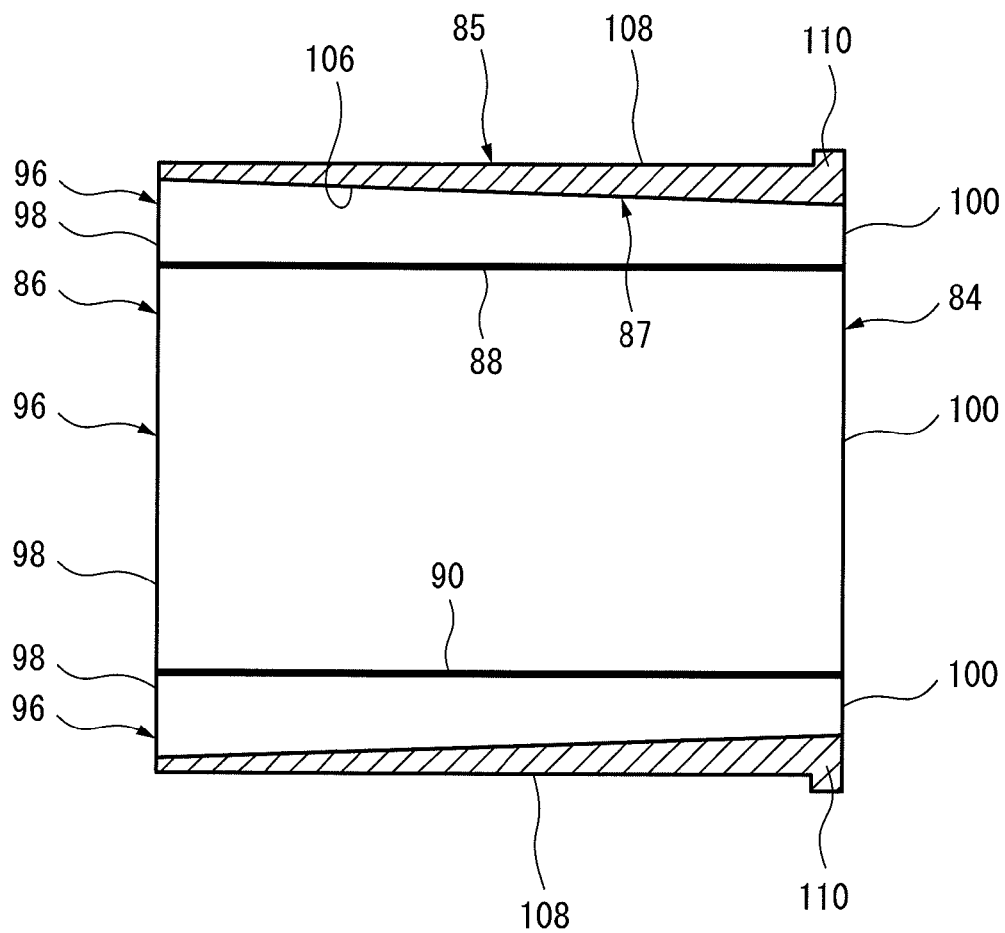
FIG. 12 is a cross sectional view of the magnet mounting member shown in FIG. 11 cut along line XII-XII in FIG. 11.

The inner periphery 106 of the segment 96 is a tapered surface which continuously expands radially outward as extending axially frontward from the end 100 to the end 98 (see FIG. 12). On the other hand, the outer periphery 108 of the segment 96 is a circular arc surface having an outer diameter that is constant in the axial direction. Accordingly, the thickness in radial direction of the segment 96 becomes gradually small the further toward axially front ward from the end 98 to the end 100. In addition, the end 100 of the segment 96 is provided with a projection 110 that projects radially outward from the outer periphery 108 of the segment 96.

Figure 11:
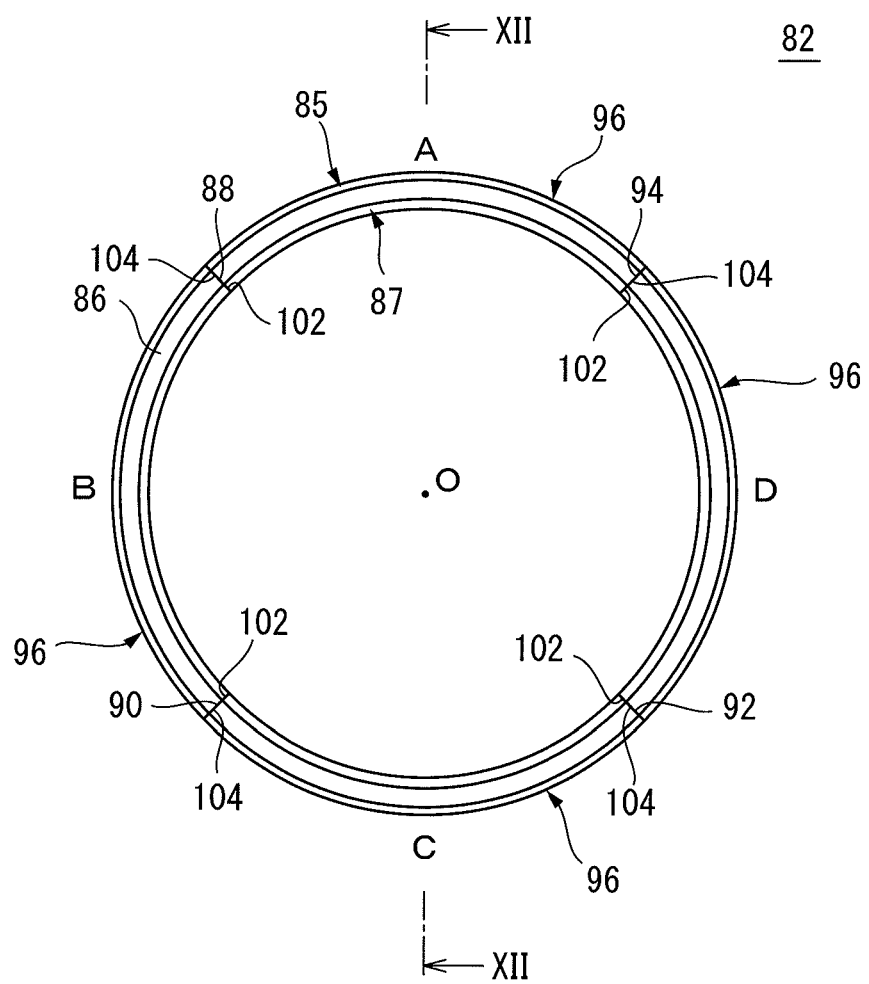
FIG. 11 is an appearance view of a magnet mounting member according to still another embodiment of the invention when seen from the front in the axial direction.

A tubular magnet mounting member 82 is constituted by arranging the segments 96 at the circumferential positions A to D shown in FIG. 11. Here, the end surface 104 of the segment 96 placed at the circumferential position A and the end surface 102 of the segment 96 placed at the circumferential position B face each other, whereby a slit 88 is defined between these end surfaces 104 and 102.

Similarly, a slit 90 is defined between the end surface 104 of the segment 96 placed at the circumferential position B and the end surface 102 of the segment 96 placed at the circumferential position C. Further, a slit 92 is defined between the end surface 104 of the segment 96 placed at the circumferential position C and the end surface 102 of the segment 96 placed at the circumferential position D. Further, a slit 94 is defined between the end surface 104 of the segment 96 placed at the circumferential position D and the end surface 102 of the segment 96 placed at the circumferential position A.

When four segments 96 are arranged as stated above, their axially rear end surfaces 100 are aligned in the circumferential direction, whereby the ring-shaped first end 84 of the magnet mounting member 82 is formed. Similarly, their axially front end surfaces 100 are aligned in the circumferential direction, whereby the ring-shaped second end 86 of the magnet mounting member 82 is formed. Further, the inner surfaces 106 of the segments 96 are aligned in the circumferential direction, whereby a tubular tapered inner surface 87 of the magnet mounting member 82 is formed. Further, the outer surfaces 108 of the segments 96 are aligned in the circumferential direction, whereby the cylindrical outer periphery 85 of the magnet mounting member 82 is formed.

When applying the magnet mounting member 82 to the rotor member 10 shown in FIG. 1, the pair of magnets 14 axially adjoining each other is placed on the outer periphery 108 of each segment 96. Therefore, each of the slits 88, 90, 92 and 78 is inevitably arranged at a position between the magnets 14 which adjoin each other in the circumferential direction.

Next, referring to FIGS. 14 to 16, a rotor member 210 according to still another embodiment of the invention will be described. Note that, elements similar as the above-mentioned embodiment are denoted by the same reference numerals, and a detailed description thereof will be omitted. The rotor member 210 includes a magnet mounting member 212; a plurality of magnets 214 arranged in the circumferential direction at radially outside of the magnet mounting member 212; and a tubular holding member 16 arranged radially outside of the magnets 214. The magnet mounting member 212 is comprised of a total of eight segments 216 which are arranged in the circumferential direction. The magnet 214 is arranged between each segment 216 and the holding member 16.

Figure 17:
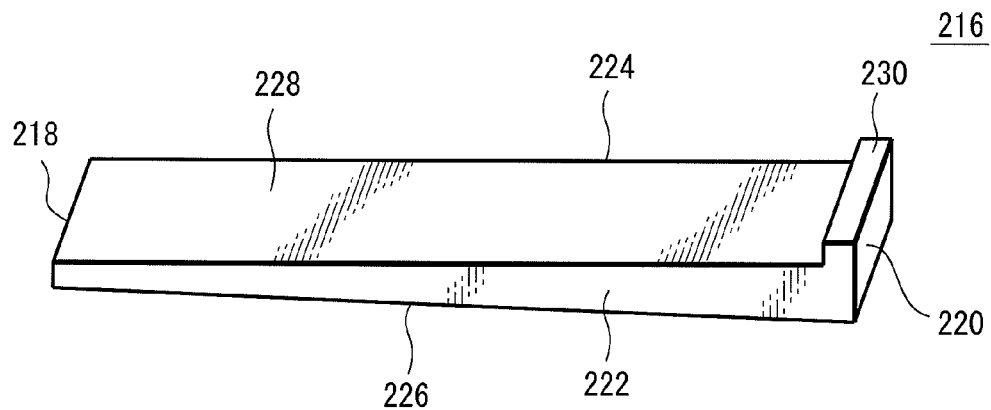
FIG. 17 is a perspective view of one segment of the rotor member shown in FIG. 14.

Next, referring to FIG. 17, one of the segments 216 constituting the magnet mounting member 212 will be described below. The segment 216 includes an axially front end 218; an axially rear end 220; end surfaces 222 and 224 in the circumferential direction; an inner periphery 226 and an outer periphery 228.

The inner periphery 226 of the segment 216 is a tapered flat surface which is slanted with respect to the axis O so as to continuously expand radially outward as extending from the axially rear end 220 to the axially front end 218. On the other hand, the outer periphery 228 of the segment 216 is a flat surface parallel to the axis O (i.e., the distance from the axis O is constant in the axial direction). The axially rear end 220 of the segment 216 is provided with a projection 230 projecting radially outward from the outer periphery 228.

Figure 18:
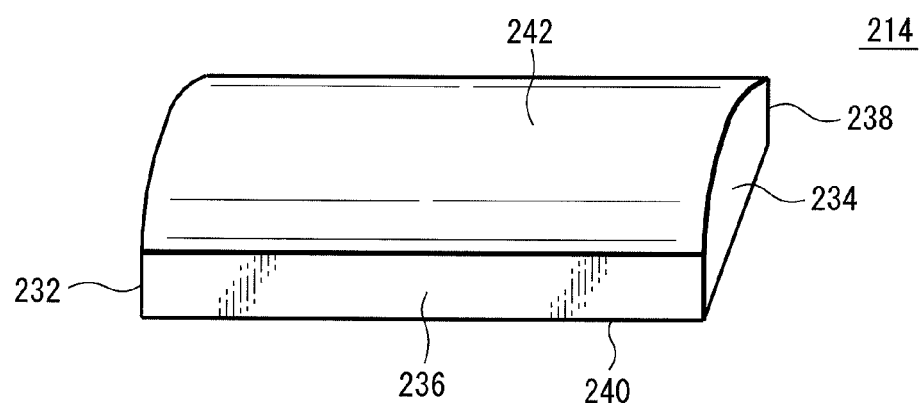
FIG. 18 is a perspective view of one of the magnets shown in FIG. 14.

Next, referring to FIG. 18, the magnet 214 according to the present embodiment will be described. Each magnet 214 includes an axially front end surface 232; an axially rear end surface 234; end surfaces 236 and 238 in the circumferential direction; an inner surface 240 and an outer periphery 242. The inner periphery 240 of the magnet 214 is a flat surface parallel to the axis O (i.e., the distance from the axis O is constant in the axial direction). On the other hand, the outer periphery 242 is a curved surface having a predetermined curvature radius. The outer periphery 242 may be constituted by any curved surface, or a combination of curved surfaces having different curvature radii.

Figure 19:
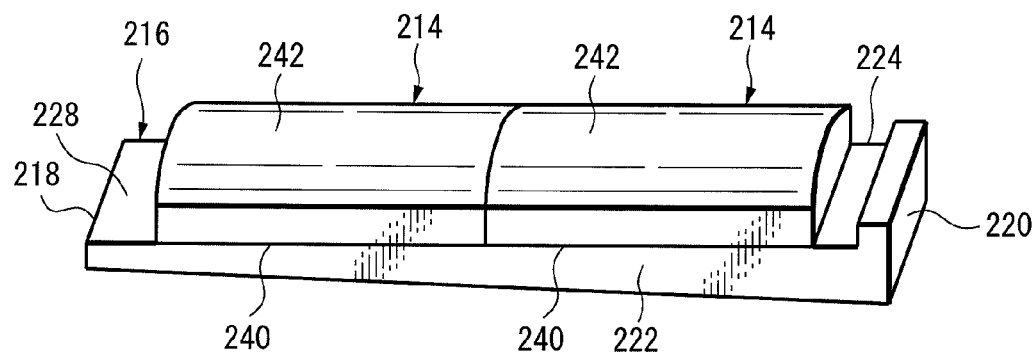
FIG. 19 is a perspective view of an assembly of the segment and the magnet.

As shown in FIG. 19, a pair of magnets 214 arranged in the axial direction is placed on the outer periphery 228 of the segment 216. The assemblies, each of which is assembled with the segment 216 and the magnets 214 as shown in FIG. 19, are arranged at the circumferential positions E to L shown in FIGS. 14 and 15, at regular intervals. Similar to the above embodiments, the magnets 214 are circumferentially arranged so that the magnetic poles the magnets 214 change in the circumferential direction in an alternate manner. The holding member 16 is arranged so as to surround the outer peripheries 242 of all magnets 214 from radially outside. Thus, the rotor member 210 shown in FIGS. 14 and 15 is configured.

Figure 14:
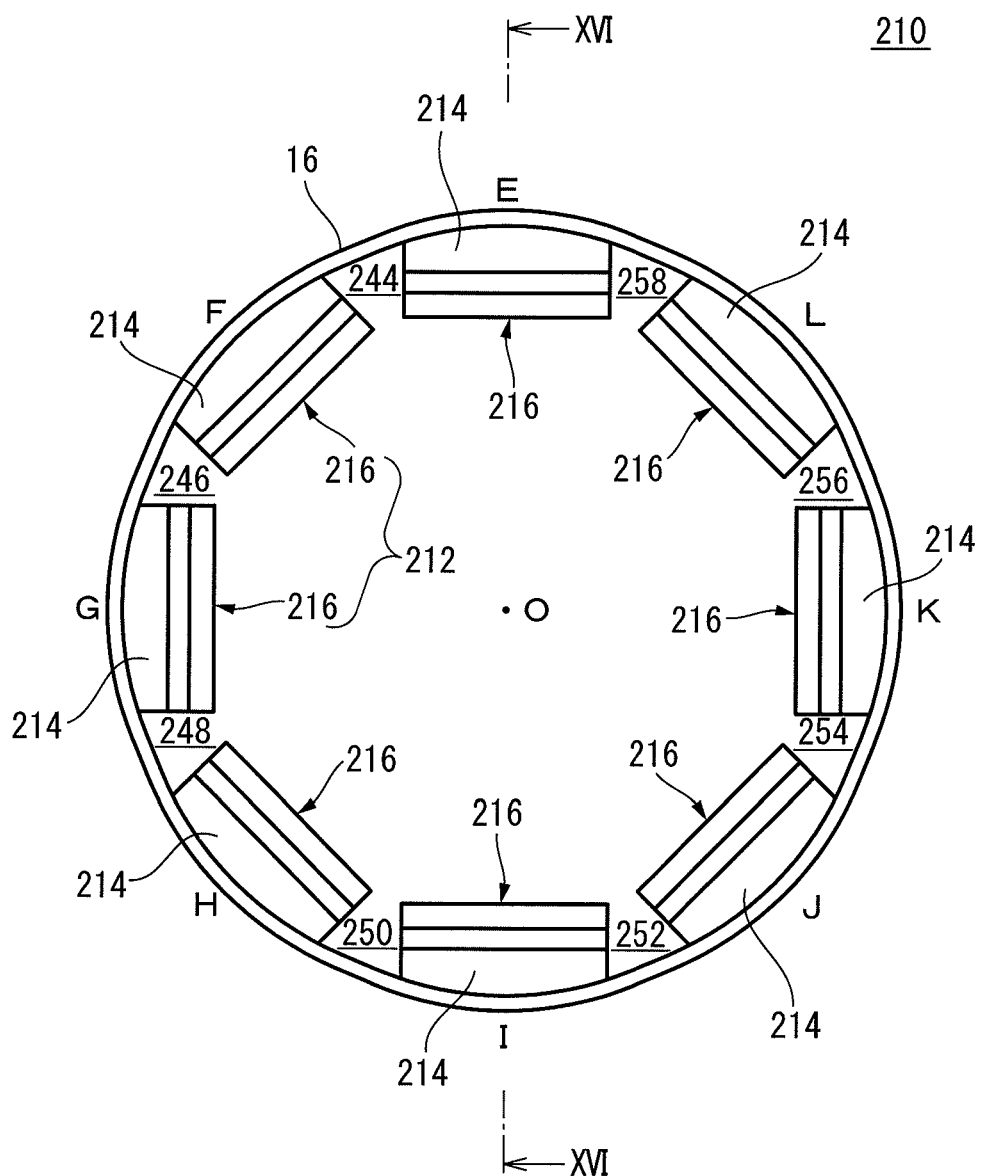
FIG. 14 is an appearance view of a rotor member according to still another embodiment of the invention when seen from the front in the axial direction.
Figure 15:
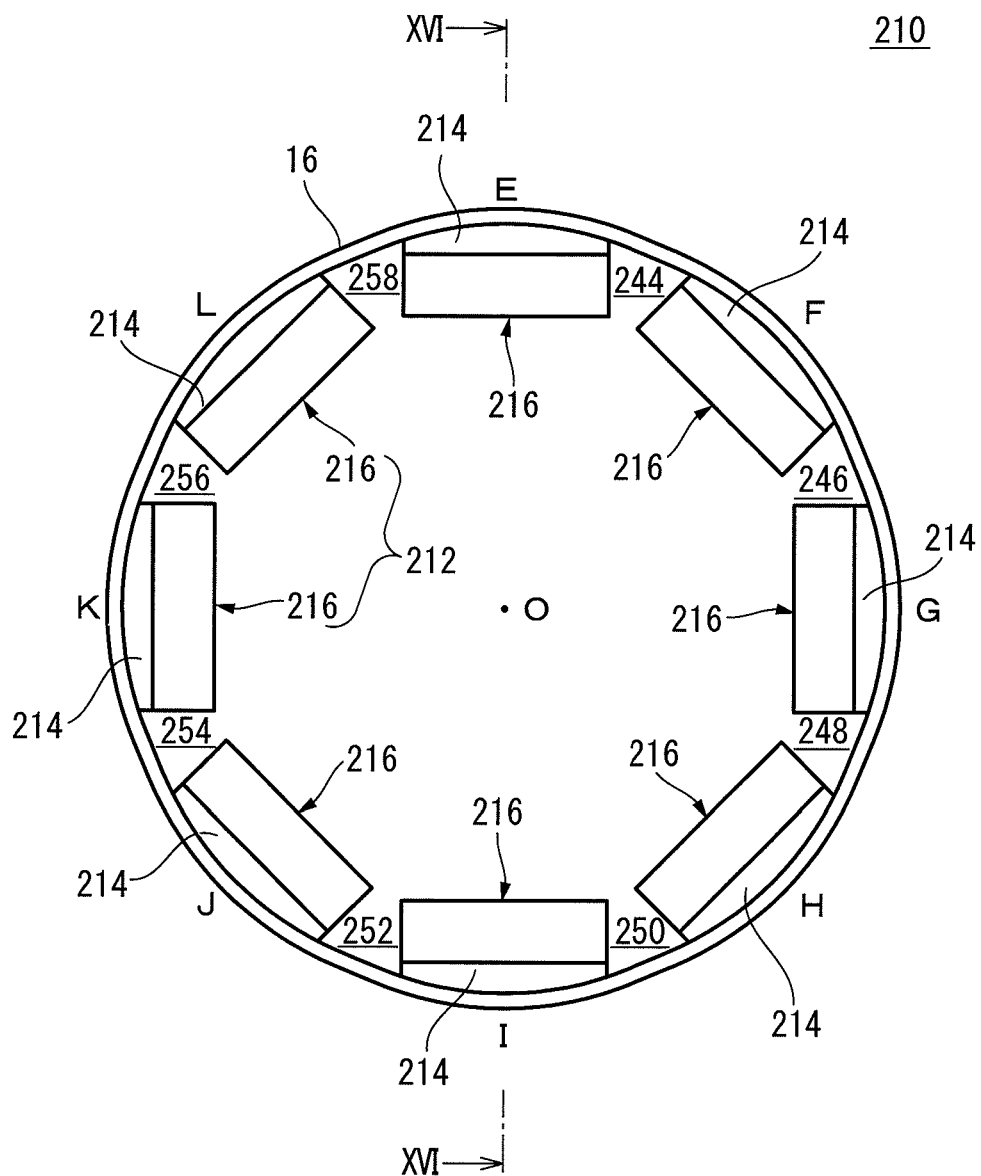
FIG. 15 is an appearance view of the rotor member shown in FIG. 14 when seen from the rear in the axial direction.
Figure 16:
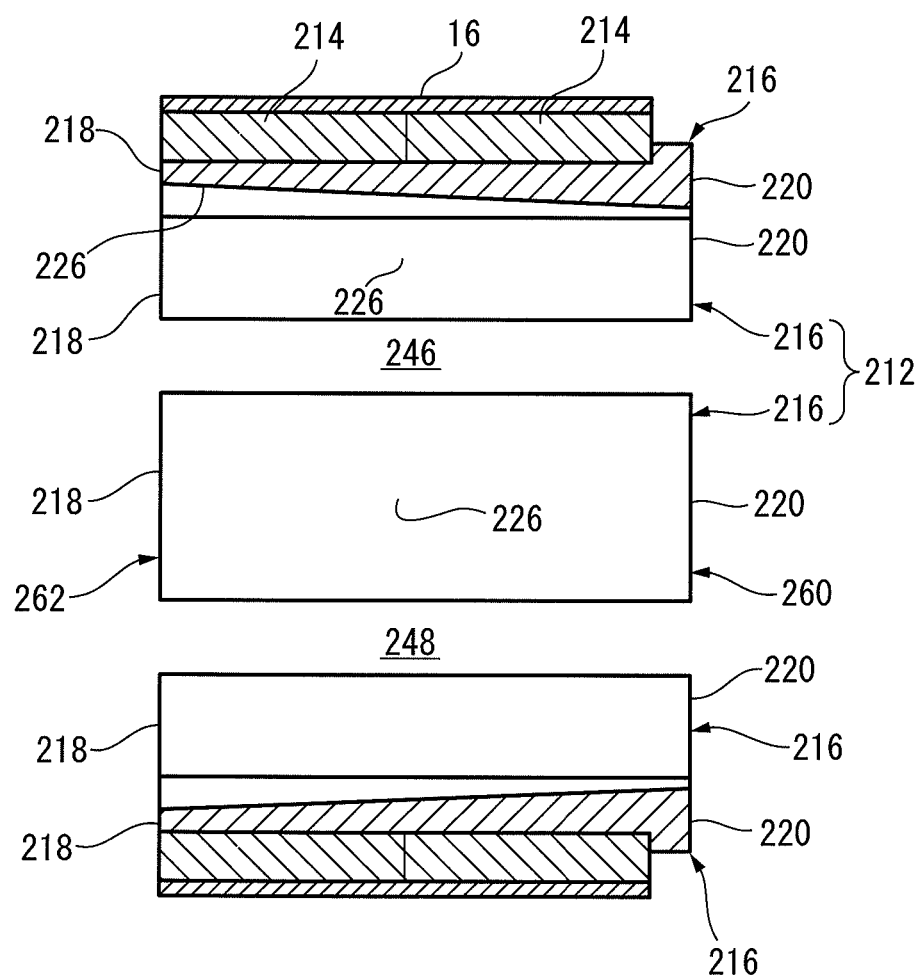
FIG. 16 is a cross sectional view of the rotor member shown in FIG. 14 cut along line XVI-XVI in FIG. 14 (FIG. 15)

When a total of eight segments 216 are circumferentially arranged as shown in FIGS. 14 and 15, the axially rear ends 220 of the segments 216 are aligned in the circumferential direction, whereby a first end 260 (FIG. 16) at the axially rear side of the magnet mounting member 212 is defined. Similarly, the axially front ends 218 of the segments 216 are aligned in the circumferential direction, whereby a second end 262 (FIG. 16) at the axially front side of the magnet mounting member 212 is defined.

Further, each of gaps 244, 246, 248, 250, 252, 254, 256 and 258 is formed between the segments 216 which adjoin each other in the circumferential direction. The gaps 244, 246, 248, 250, 252, 254, 256 and 258 function as slits extending over the entire axial-direction section of the magnet mounting member 212 ranging from the first end 260 to the second end 262, and divide the magnet mounting member 212 in the circumferential direction.

Next, referring to FIGS. 20 to 23, a rotor member 120 according to still another embodiment of the invention will be described. Note that, elements similar to the above-mentioned embodiments are denoted by the same reference numerals, and a detailed description thereof is omitted. The rotor member 120 includes a wedge member 124; a magnet mounting member 122 arranged radially outside of the wedge member 124; a plurality of magnets 14 arranged radially outside of the magnet mounting member 122; and a holding member 16 arranged radially outside of the magnets 14.

Figure 22:
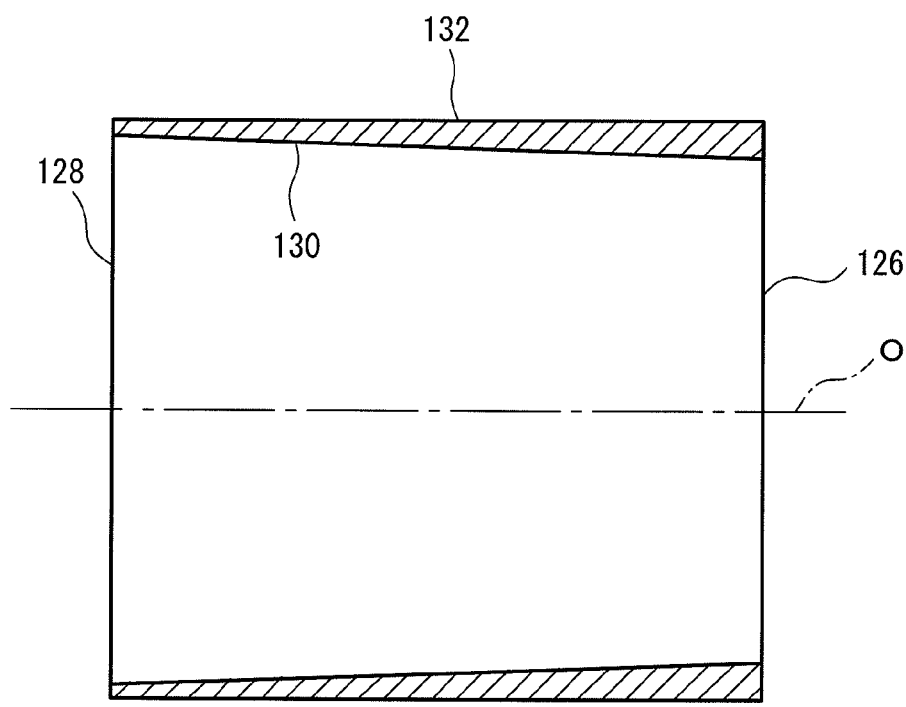
FIG. 22 is a cross sectional view of the wedge member shown in FIG. 21.

As shown in FIG. 22, the wedge member 124 is a tubular member having an axis O, and includes an axially rear end surface 126; an axially front end surface 128; an inner periphery 130 and an outer periphery 132. The inner periphery 130 is a tapered surface continuously expanding radially outward as extending from the end surface 126 to the end surface 128. The outer periphery 132, on the other hand, is a cylindrical surface having an outer diameter that is constant in the axial direction. Accordingly, the thickness in the radial direction of the wedge member 124 becomes gradually smaller the further toward axially frontward. Similarly to the magnet mounting member described above, the wedge member 124 may be provided with a plurality of slits.

Figure 23:
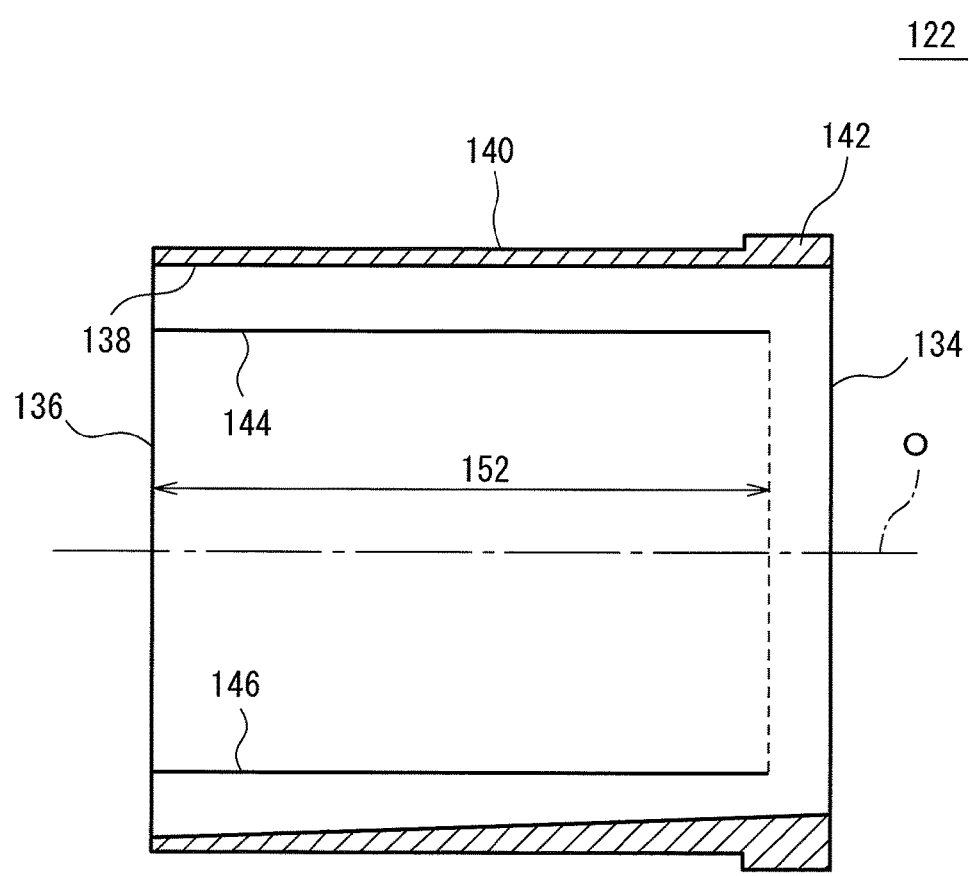
FIG. 23 is a cross sectional view of the magnet mounting member shown in FIG. 21.

As shown in FIG. 23, the magnet mounting member 122 is a cylindrical member having an axis O, and includes a first end 134 at axially rear side; a second end 136 at axially front side; an inner periphery 138 and an outer periphery 140. A projection 142 is formed at the axially rear end portion of the outer periphery 140 of the magnet mounting member 122 so as to project radially outward from the outer periphery 140. Similar to the above projection 24, the projection 142 is an example of an element for facilitating to match the axial directions of the magnets 14 during the manufacturing process.

The magnet mounting member 122 includes slits 144, 146, 148 and 150 formed at four locations. Each of the slits 144, 146, 148 and 150 is formed so as to radially extend through the magnet mounting member 122 from the inner periphery 138 to the outer periphery 140, and extend over the axial-direction section 152 of the magnet mounting member 122. The axial-direction section 152 includes the second end 136 and excludes the first end 134. The inner periphery 138 and the outer periphery 140 of the magnet mounting member 122 are tubular surfaces having radii constant in the axial direction.

Next, referring to FIG. 24, an electric motor 160 according to an embodiment of the invention will be described. Note that, leftward in FIG. 24 corresponds to axially frontward, and rightward in FIG. 24 corresponds to axially rearward. The electric motor 160 is an example of a rotary electric machine. The electric motor 160 includes a housing 164 defining an internal space 162; a stator 166 arranged stationary in the inner space 162; and a rotor 180 rotatably arranged radially inside of the stator 166. The stator 166 includes a stator core 168 and a coil 170 wound around the stator core 168. The stator core 168 may be made of e.g. thin electromagnetic plates stacked with each other.

A power line (not shown) electrically connected to the coil 170 is leaded out from the stator 166 and connected to a power source (not shown) installed outside of the electric motor 160 via a passage hole formed at the housing 164. The rotor 180 rotates about the axis O. The rotor 180 includes a rotary shaft 182 extending in the axial direction in the inner space 162; and the above-mentioned rotor member 10 fixed to the radially outside of the rotary shaft 182.

Figure 25:
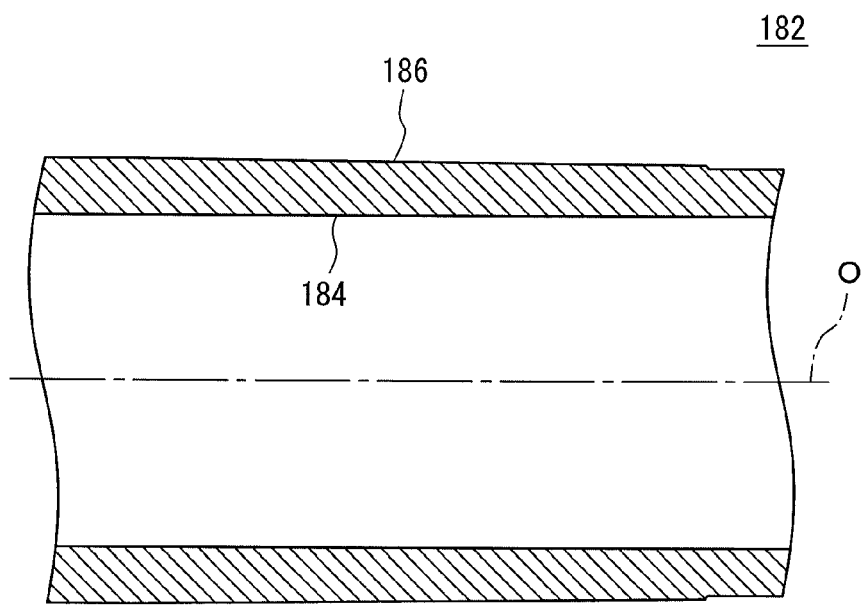
FIG. 25 is a cross sectional view of the rotary shaft shown in FIG. 24.
Figure 26:
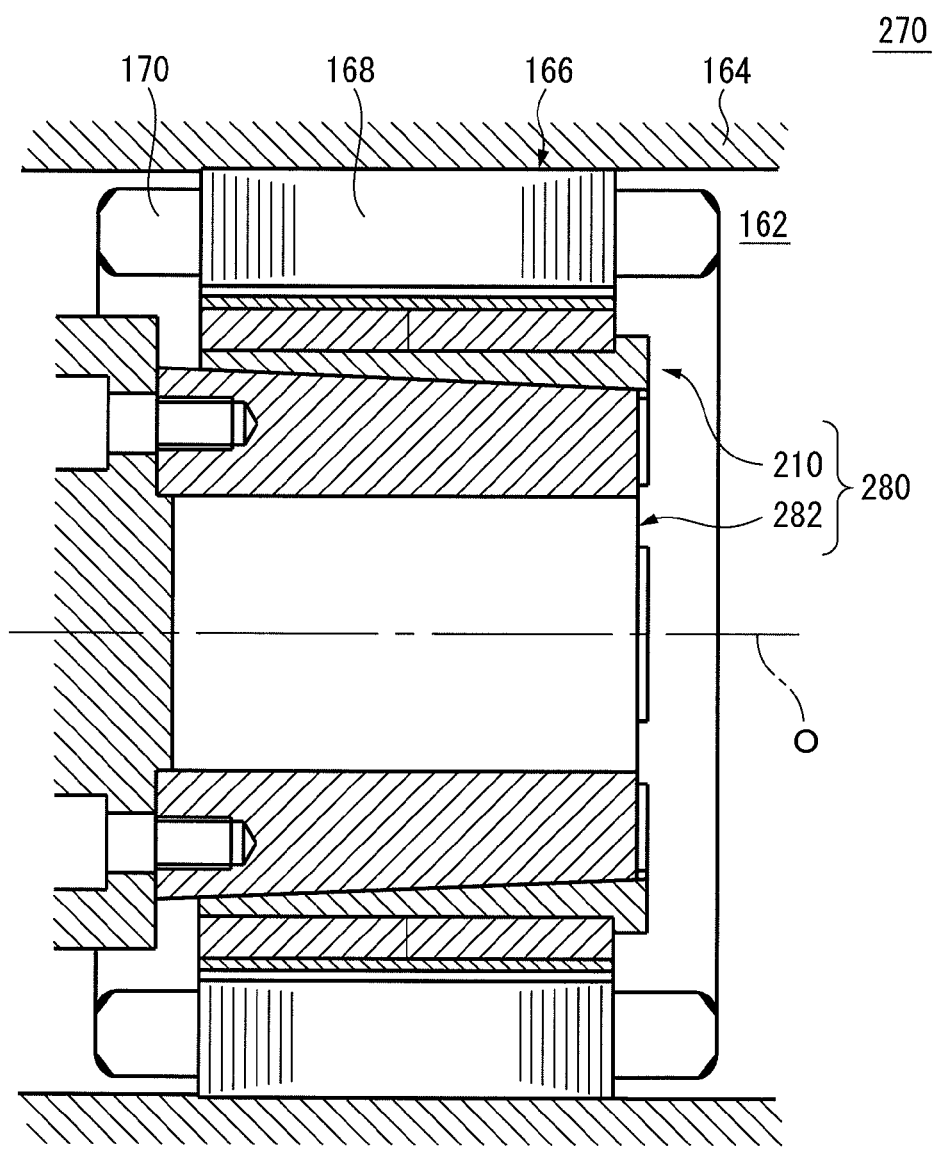
FIG. 26 is a cross sectional view of an electric motor according to another embodiment of the invention.
Figure 27:
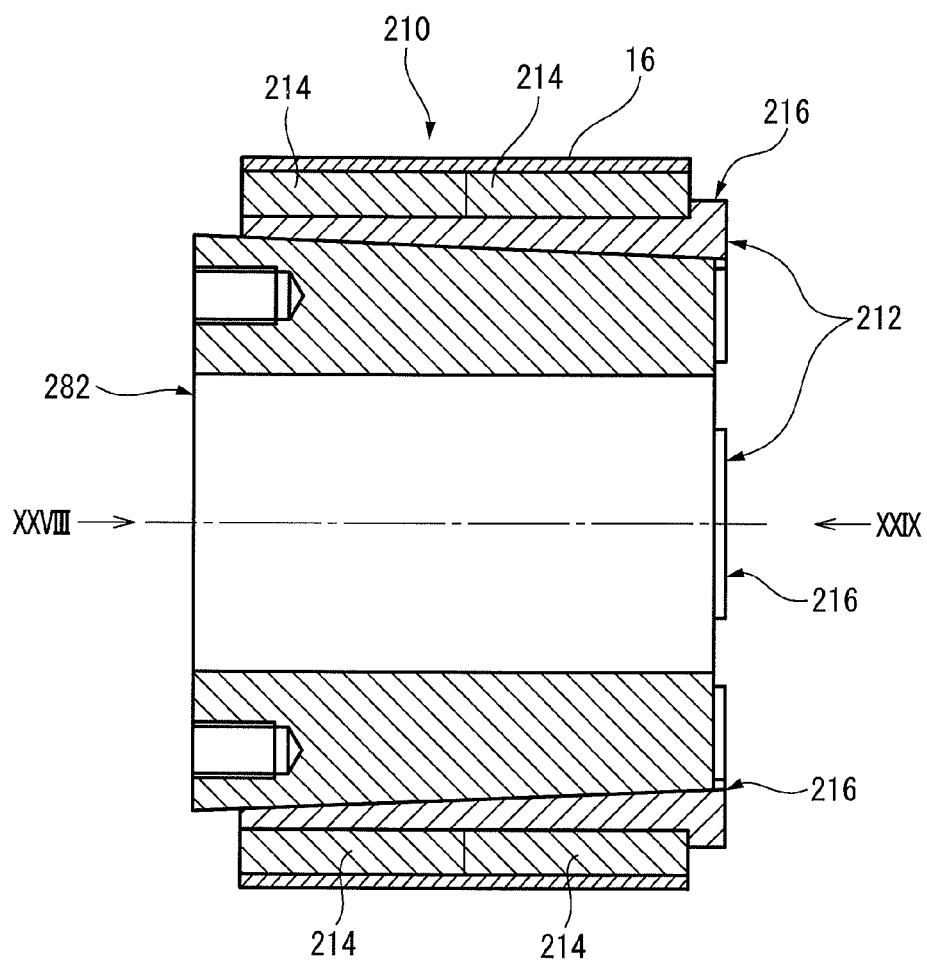
FIG. 27 is a cross sectional view of the rotor shown in FIG. 26.
Figure 28:
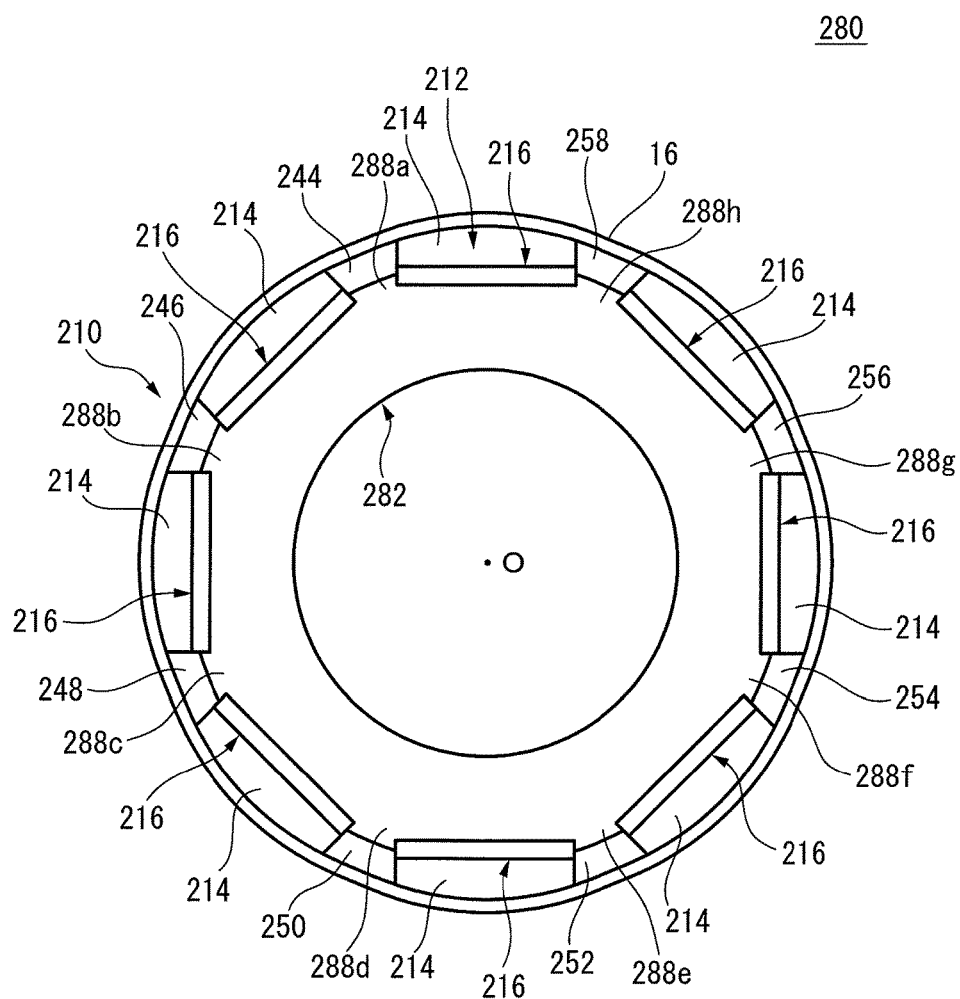
FIG. 28 is an appearance view of the rotor shown in FIG. 27 when seen from the front in the axial direction (i.e., when seen in the direction indicated by arrow XXVIII in FIG. 27)
Figure 29:
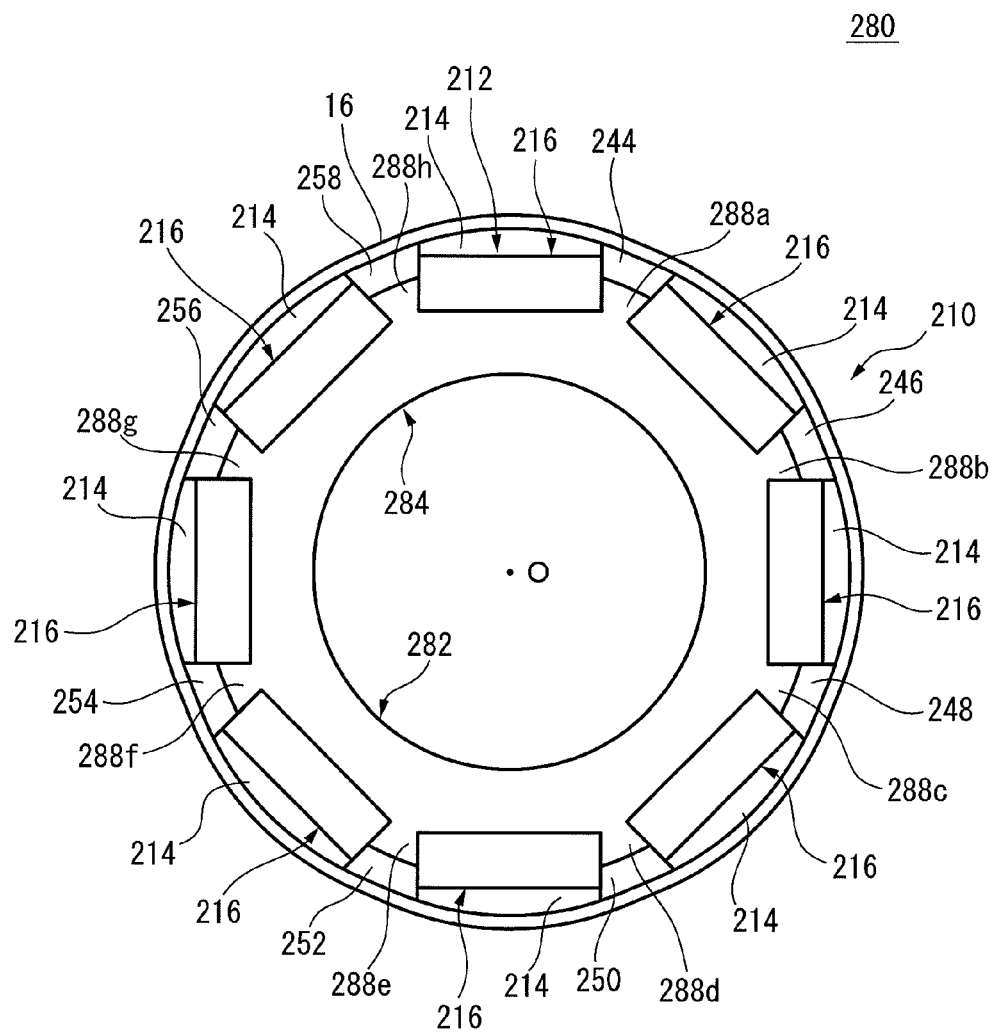
FIG. 29 is an appearance view of the rotor shown in FIG. 27 when seen from the rear in the axial direction (i.e., when seen in the direction indicated by arrow XXIX in FIG. 27)

Next, referring to FIG. 25, the rotary shaft 182 will be described. The rotary shaft 182 is a tubular member having an axis O, and includes a center hole 184 formed to be concentric with the axis O. In the present embodiment, the rotary shaft 182 is formed with the center hole 184 for the sake of applying it to a built-in motor used in a main shaft of a machine tool. However, the rotary shaft may be comprised of a solid member without the center hole.

The axially front portion of the rotary shaft 182 is rotatably supported by the housing 164 via a bearing (not shown) mounted to an axially front wall of the housing 164. Similarly, the axially rear portion of the rotary shaft 182 is rotatably supported by the housing 164 via a bearing (not shown) mounted to an axially rear wall of the housing 164.

The rotary shaft 182 includes a tapered outer periphery 186 which continuously expands radially outward as extending from axially rear side to axially front side. The outer periphery 186 may preferably be a linear tapered surface (i.e., a conical surface). In this case, the outer diameter of the outer periphery 186 linearly increases the further toward axially frontward. A taper ratio of the outer periphery 186 in this case ranges from 1/200 to 1/30, for example.

The rotor member 10 is fixed to the outer periphery 186 of the rotary shaft 182 so that the inner periphery 26 of the magnet mounting member 12 surface-contacts the outer periphery 186 of the rotary shaft 182. The degree (or ratio) of the taper of the inner periphery 26 of the magnet mounting member 12 is set to correspond to that of the outer periphery 186 of the rotary shaft 182. For example, if both of the outer periphery 186 of the rotary shaft 182 and the inner periphery 26 of the magnet mounting member 12 are linear tapered surfaces, the outer periphery 186 and the inner periphery 26 has a same taper ratio (e.g. 1/100).

Figure 24:
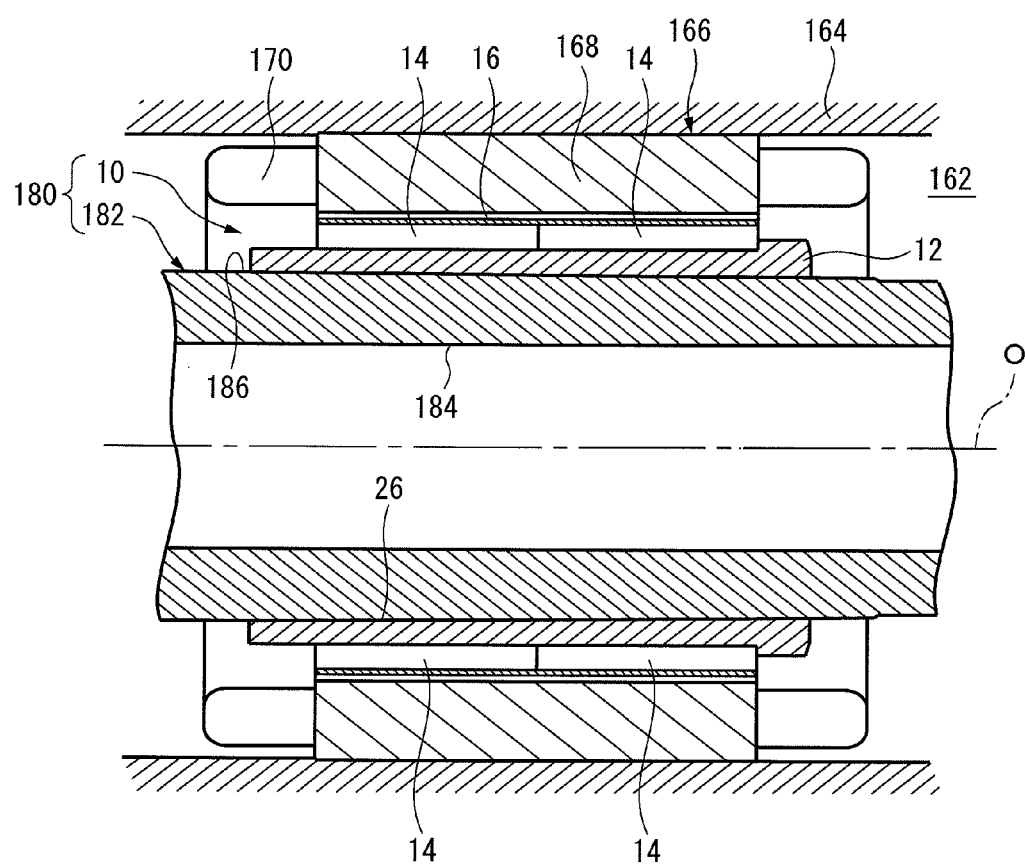
FIG. 24 is a cross sectional view of an electric motor according to an embodiment of the invention.

When the rotor member 10 is press-fitted over the rotary shaft 182 so as to assemble the rotor 180 shown in FIG. 24, the magnet mounting member 12 and the magnets 14 are pressed and displaced radially outward by the rotary shaft 182, whereby a tensile strength is given to the holding member 16. Due to the tensile strength given to the holding member 16, an elastic compression force is generated in the holding member 16, whereby the magnets 14 and the magnet mounting member 12 are firmly held between the holding member 16 and the rotary shaft 182 by the action of the elastic compression force.

Next, referring to FIGS. 26 to 29, an electric motor 270 according to another embodiment of the invention will be described. Note that, elements similar to the above-mentioned embodiments are denoted by the same reference numerals, and a detailed description thereof will be omitted. Further, leftward in FIG. 26 corresponds to axially frontward, while the rightward in FIG. 26 corresponds to axially rearward. The electric motor 270 includes a housing 164; a stator 166 arranged in the inner space 162 of the housing 164; and a rotor 280 rotatably arranged radially inside of the stator 166.

The rotor 280 rotates about an axis O. The rotor 280 includes a rotary shaft 282 axially extending in the inner space 162, and the above-mentioned rotor member 210 fixed to the radially outside of the rotary shaft 282.

Figure 30:
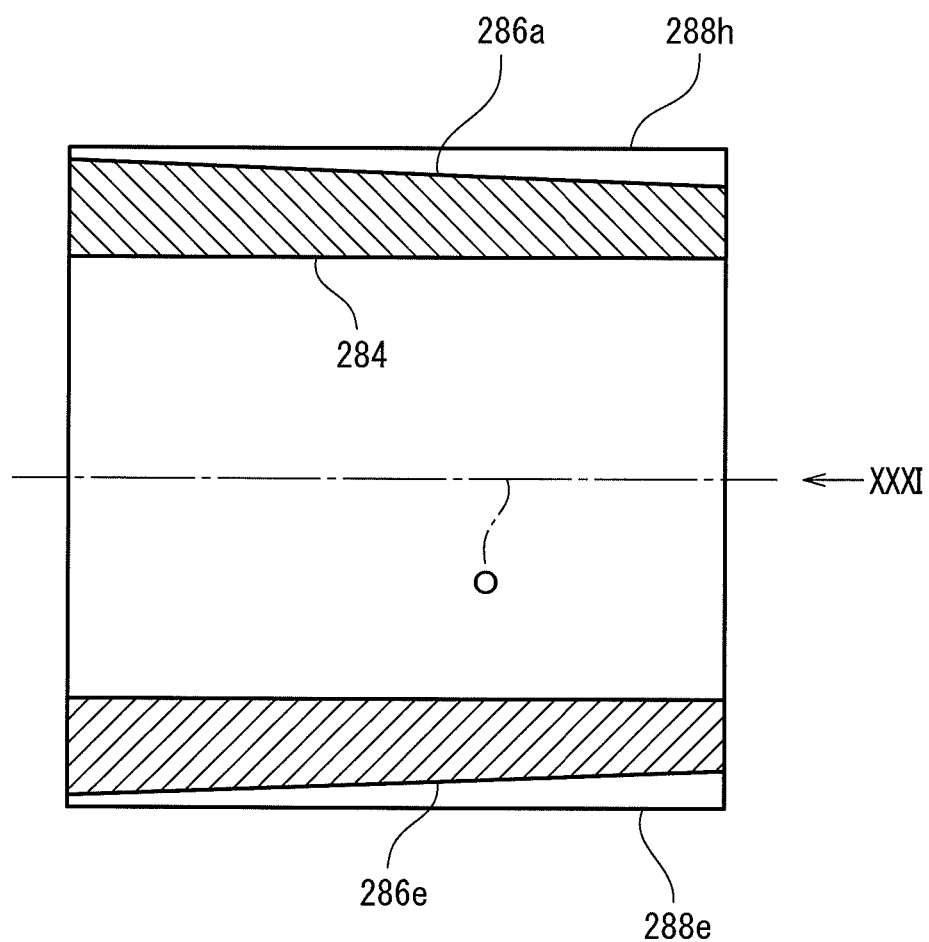
FIG. 30 is a cross sectional view of the rotary shaft shown in FIG. 27.
Figure 31:
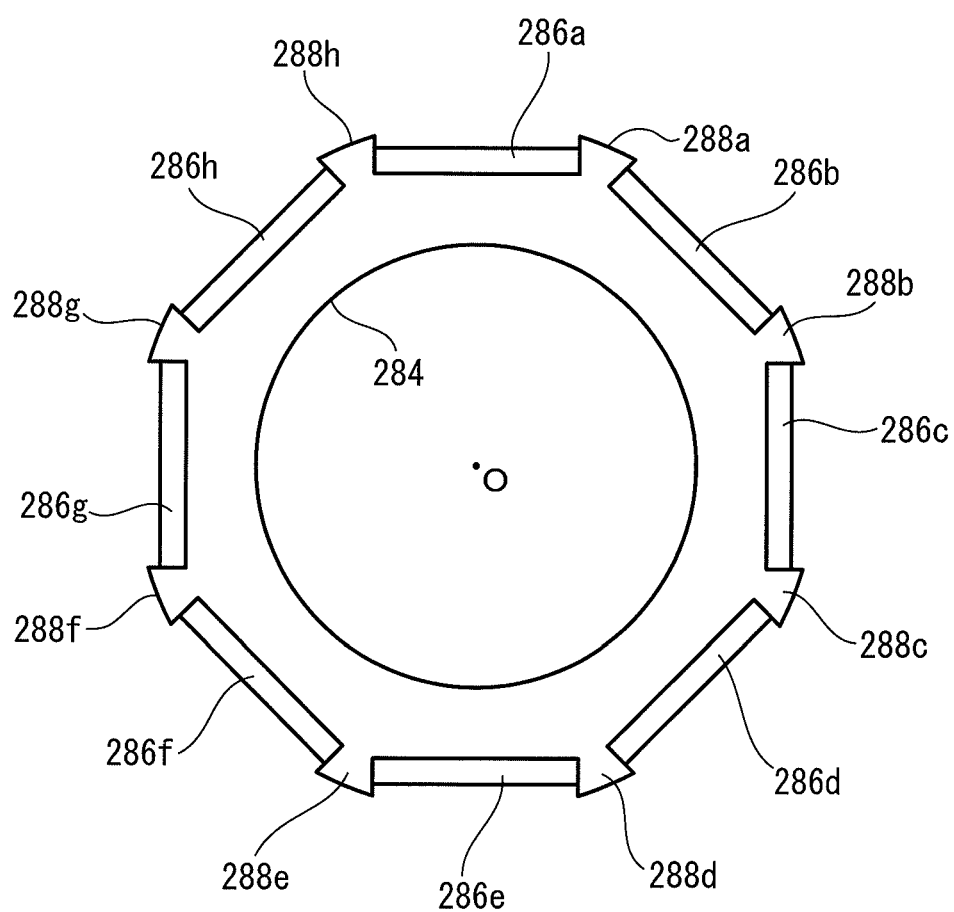
FIG. 31 is an appearance view of the rotary shaft shown in FIG. 30 when seen from the rear in the axial direction (i.e., when seen in the direction indicated by arrow XXXI in FIG. 30)
Figure 32:
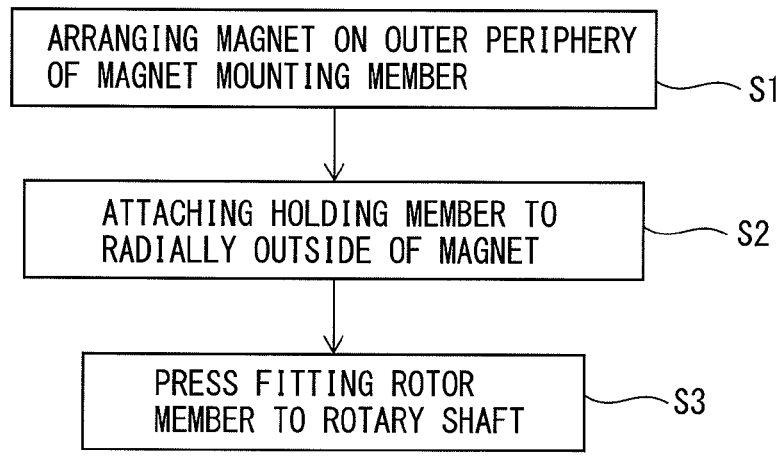
FIG. 32 is a flowchart of a method of manufacturing a rotor, according to an embodiment of the invention.

Next, referring to FIGS. 30 and 31, the rotary shaft 282 according to the present embodiment will be described. The rotary shaft 282 is a tubular member having an axis O, and includes a center hole 284 formed to be concentric with the axis O. Note that, the rotary shaft 282 may be comprised of a solid member without the center hole.

The rotary shaft 282 includes a total of eight outer surfaces 286a, 286b, 286c, 286d, 286e, 286f, 286g and 286h. Each of the outer surfaces 286a to 286h is a tapered flat surface which is slanted with respect to the axis O so as to continuously expand radially outward as extending from axially rear side to axially front side.

A projection 288a is formed between the outer surfaces 286a and 286b. The projection 288a projects radially outward from the outer surfaces 286a and 286b and extends in the axial direction. Similarly, projections 288b, 288c, 288d, 288e, 288f, 288g, and 288h are respectively formed between the outer surfaces 286b and 286c, between the outer surfaces 286c and 286d, between the outer surfaces 286d and 286e, between the outer surfaces 286e and 286f, between the outer surfaces 286f and 286g, between the outer surfaces 286g and 286h, and between the outer surfaces 286h and 286a.

Referring to FIGS. 27 to 29 again, when assembling the rotor 280, the assembly of the segment 216 and the magnet 214 shown in FIG. 19 is arranged on each of the outer surfaces 286a, 286b, 286c, 286d, 286e, 286f, 286g and 286h. Further, the projections 288a, 288b, 288c, 288d, 288e, 288f, 288g and 288h are respectively fitted into the gaps 244, 246, 248, 250, 252, 254, 256, and 258. The projections 288a to 288h restrict the circumferential movement of the segments 216 so as to position the segments 216 at predetermined circumferential positions at regular intervals.

Next, referring to FIGS. 32 to 35, an example of a method of manufacturing the rotor 180 will be described. At Step S1, the user places a total of eight magnets 14 on the outer periphery 22 of the magnet mounting member 12. Specifically, the user aligns two magnets 14 in the axial direction so as to form a pair of magnets 14, and places it on the outer periphery 22 of the magnet mounting member 12 at the circumferential position A shown in FIG. 1.

Similarly, the user aligns two magnets 14 in the axial direction so as to form a pair of magnets 14, and places it on the outer periphery 22 of the magnet mounting member 12 at each of the circumferential position B, C and D. At this time, each of the slits 28, 30, 32 and 34 is arranged at a position between the magnets 14 adjacent to each other in the circumferential direction. When placing the magnets 14 at the predetermined circumferential positions in such manner, the user can use a jig for arranging the magnets 14 at regular intervals. Due to such jig, it is possible to facilitate the manufacturing process.

The direction of the magnetic field of the magnets 14 arranged at the circumferential position A is set so that the S pole comes to the side of the inner periphery 46 of the magnets 14, while the N pole comes to the side of the outer periphery 48. On the other hand, the direction of the magnetic field of the magnets 14 arranged at the circumferential position B is set so that the N pole comes to the side of the inner periphery 46 of the magnets 14, while the S pole comes to the side of the outer periphery 48.

In addition, the direction of the magnetic field of the magnets 14 arranged at the circumferential position C is set so that the S pole comes to the side of the inner periphery 46 of the magnets 14, while the N pole comes to the side of the outer periphery 48. Furthermore, the direction of the magnetic field of the magnets 14 arranged at the circumferential position D is set so that the N pole comes to the side of the inner periphery 46 of the magnets 14, while the S pole comes to the side of the outer periphery 48. Thus, the magnets 14 are arranged in the circumferential direction so that their S and N magnetic poles change in the circumferential direction in an alternate manner.

It is preferred that the magnets 14 are magnetized prior to Step S1. In this case, due to their magnetic attraction forces, it is possible to facilitate the work for installing the magnets 14 on the outer periphery 22 of the magnet mounting member 12, which is made of a magnetic material, at the predetermined positions.

On the other hand, in the case of the magnet mounting member 82 shown in FIGS. 11 and 12, at this Step S1, the user aligns two magnets 14 in the axial direction so as to form a pair of magnets 14, and places it on the outer periphery 108 of each of the segments 96. Further, when manufacturing the rotor 280 shown in FIG. 26, at this Step S1, the user aligns two magnets 214 in the axial direction so as to form a pair of magnets 14, and places it on the outer periphery 228 of each of the segments 216, whereby manufactures the assembly of the segment 216 and the magnets 214 shown in FIG. 19.

At Step S2, the user attaches the holding member 16 to the radially outside of the magnets 14 so as to surround the magnets 14 from radially outside thereof. Specifically, the user fits the holding member 16 over the radially outside of the magnets 14 so that the inner periphery 54 of the holding member 16 faces the outer periphery 48 of each magnet 14.

At this time, the holding member 16 may be loose-fitted to the outer circumferences of the magnets 14, or be interference-fitted to the outer circumferences of the magnets 14 with an appropriate interference. When the holding member 16 is interference-fitted, the holding member 16 may be given a proper interference so that the holding member 16 does not drop out from the magnets 14.

Alternatively, at this Step S2, the user may attach the holding member 16 to the outer circumferences of the magnets 14 by directly winding material of the holding member 16 around the outer circumferences of the magnets 14. For example, the user may winds a thread-like, a belt-like or a sheet-like material around the outer circumferences of the magnets 14 for several turns until it has a predetermined radial thickness, so as to form the holding member 16 having a predetermined radial thickness.

On the other hand, in the case of the magnet mounting member 82 shown in FIGS. 11 and 12, at this Step S2, the user attaches the holding member 16 to the outer circumferences of the magnets 14 in the state where the segments 96 are appropriately arranged in the circumferential direction by using e.g. a suitable jig. Further, in the case of the rotor 280 shown in FIG. 26, the user attaches the holding member 16 to the outer circumferences of the magnets 214 in the state where the assemblies of the segment 216 and the magnet 214 shown in FIG. 19 are appropriately arranged in the circumferential direction by using e.g. a suitable jig.

Figure 33:
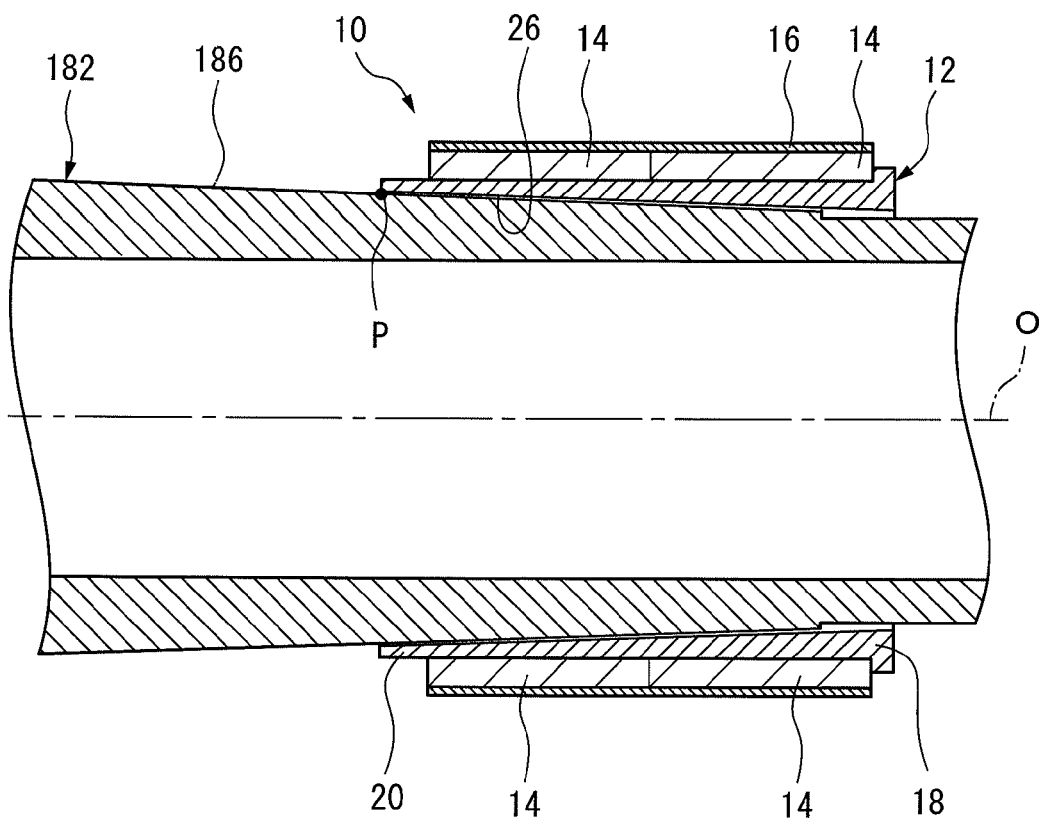
FIG. 33 is a view for explaining a process of press-fitting the rotor member to the rotor, wherein the front end of the magnet mounting member contacts the outer periphery of the rotary shaft.

As a result of Step S2, the rotor member 10 shown in FIG. 1 is manufactured. At Step S3, the user press-fits the rotor member 10 to the rotary shaft 182. This Step S3 will be described in detail below. First, the user fits the rotor member 10 manufactured at Step S2 to the rotary shaft 182 from axially rear side of the shaft 182. As a result, the axially front end of the inner periphery 26 of the magnet mounting member 12 contacts the outer periphery 186 of the rotary shaft 182 at a contact point P, as shown in FIG. 33.

Figure 34:
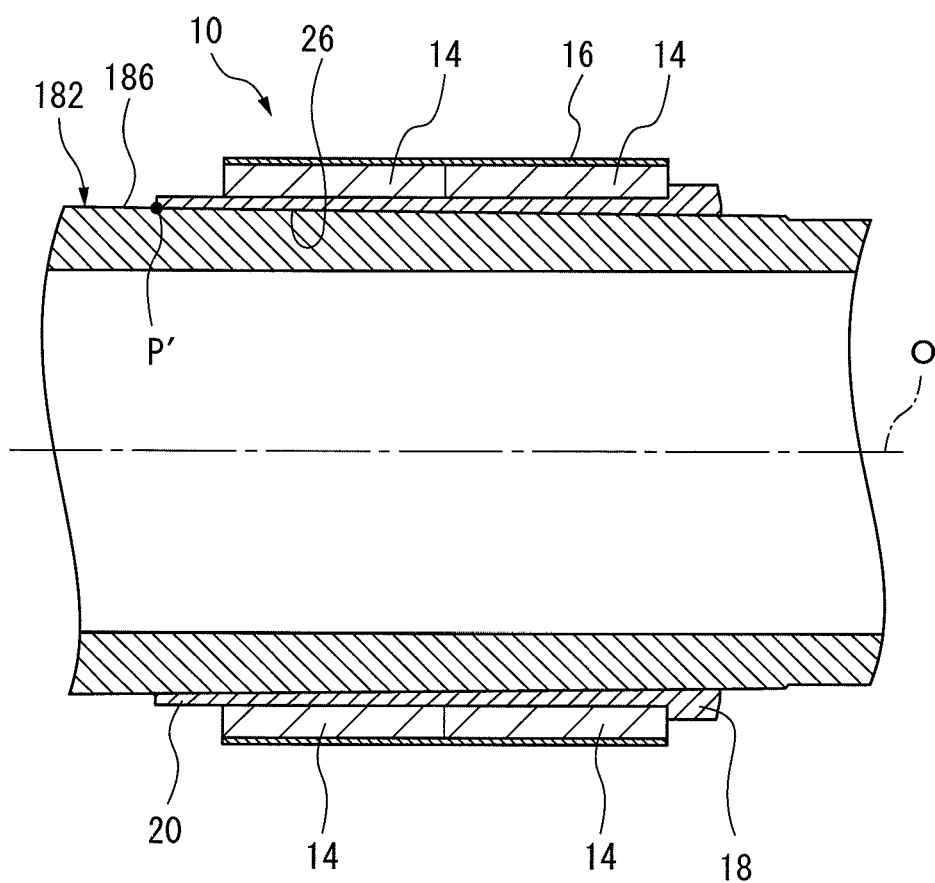
FIG. 34 shows that the rotor member is press-fitted to the rotor to a predetermined fixed position.

Then, the user pushes the first end 18 of the magnet mounting member 12 toward axially frontward so as to further press-fit the rotor member 10 to the rotary shaft 182 toward axially frontward until reaching a point P' shown in FIG. 34. As the rotor member 10 is press-fitted, the magnet mounting member 12 receives force toward radially outside from the rotary shaft 182.

As stated above, the magnet mounting member 12 according to the embodiment is formed with the slits 28, 30, 32 and 34 extending over the axial-direction section 36. Due to these slits 28, 30, 32 and 34, the magnet mounting member 12 can easily deform radially outward when receiving the force from the rotary shaft 182.

Figure 35:
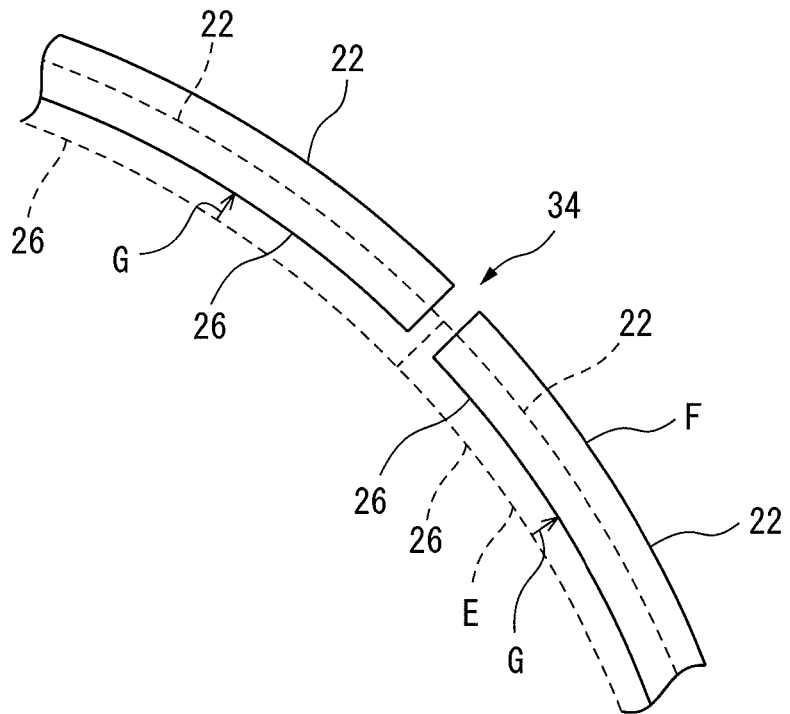
FIG. 35 is a view for explaining the deformation of the magnet mounting member in the radial direction.

Such deformation of the magnet mounting member 12 is schematically shown in FIG. 35. Note that, in FIG. 35, the deformation of the magnet mounting member 12 at the position of the slit 34 is particularly illustrated. As shown in FIG. 35, the magnet mounting member 12 can be divided in the circumferential direction at the position of the slit 34. Therefore, when receiving the force toward radially outward from the rotary shaft 182, the magnet mounting member 12 can deform in the direction indicated by the arrow G in FIG. 35 from the position indicated by the dotted line E in FIG. 35 to the position indicated by the solid line F in FIG. 35, by relatively small force. On the other hand, the elastic restoring force applied to the rotary shaft 182 from the magnet mounting member 12 when the magnet mounting member 12 is deformed radially outward becomes much smaller, when compared with the case where the magnet mounting member 12 does not includes the slit.

During press-fitting the rotor member 10 to the rotary shaft 182, the magnet mounting member 12 is pressed radially outward by the rotary shaft 182 so as to deform, and along with this action, the magnets 14 is also pressed radially outward. As a result, the holding member 16 receives force from the magnets 14 and slightly distends radially outward. In response to this force, the holding member 16 generates elastic restoring force toward radially inside to push back the magnets 14 radially inward. Thus, the magnets 14 and the magnet mounting member 12 are firmly held between the rotary shaft 182 and the holding member 16.

As described above, the elastic restoring force applied to the rotary shaft 182 from the magnet mounting member 12 becomes smaller by the slits 28, 30, 32 and 34 being formed at the magnet mounting member 12. Therefore, most part of the force applied to the rotary shaft 182 from the rotor member 10 is derived from the elastic restoring force generated by the holding member 16. In other words, it is considered that the rotor member 10 of the rotor 180 in this embodiment is interference-fitted to the rotary shaft 182 only with the interference given to the holding member 16.

Thus, according to the present embodiment, since the magnet mounting member 12 tends to easily deform in the radial direction due to the slits 28, 30, 32 and 34, it is possible to significantly reduce the force necessary for deforming the magnet mounting member 12 when press-fitting the rotor member 10 to the rotary shaft 182. Accordingly, it is possible to fix the rotor member 10 to the rotary shaft 182 with smaller press force. As a result, it is possible to facilitate the work for assembling the rotor 180, and also reduce the number of assembling processes.

Further, it is possible to assemble a rotor having a larger diameter or a larger total length, which was not possible in the prior art, and therefore a synchronous electric motor capable of generating larger torque can be easily assembled.

Further, in the present embodiment, the magnet mounting member 12 has the slits 28, 30, 32 and 34 extending over the axial-direction section 36, and therefore the magnet mounting member 12 has a monolithic structure. Due to this, the user can deal with the rotor member 10 as a single component, whereby it is possible to facilitate the operation of transporting the rotor member 10 and fixing it to the rotary shaft 182.

Figure 7:
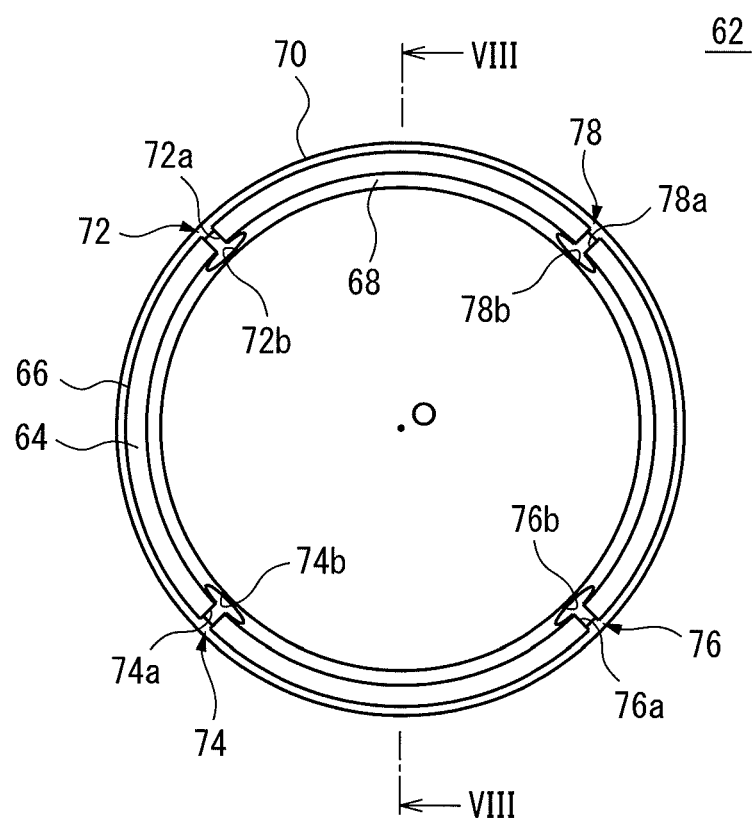
FIG. 7 is an appearance view of a magnet mounting member according to another embodiment of the invention, when seen from the front in the axial direction.
Figure 9:
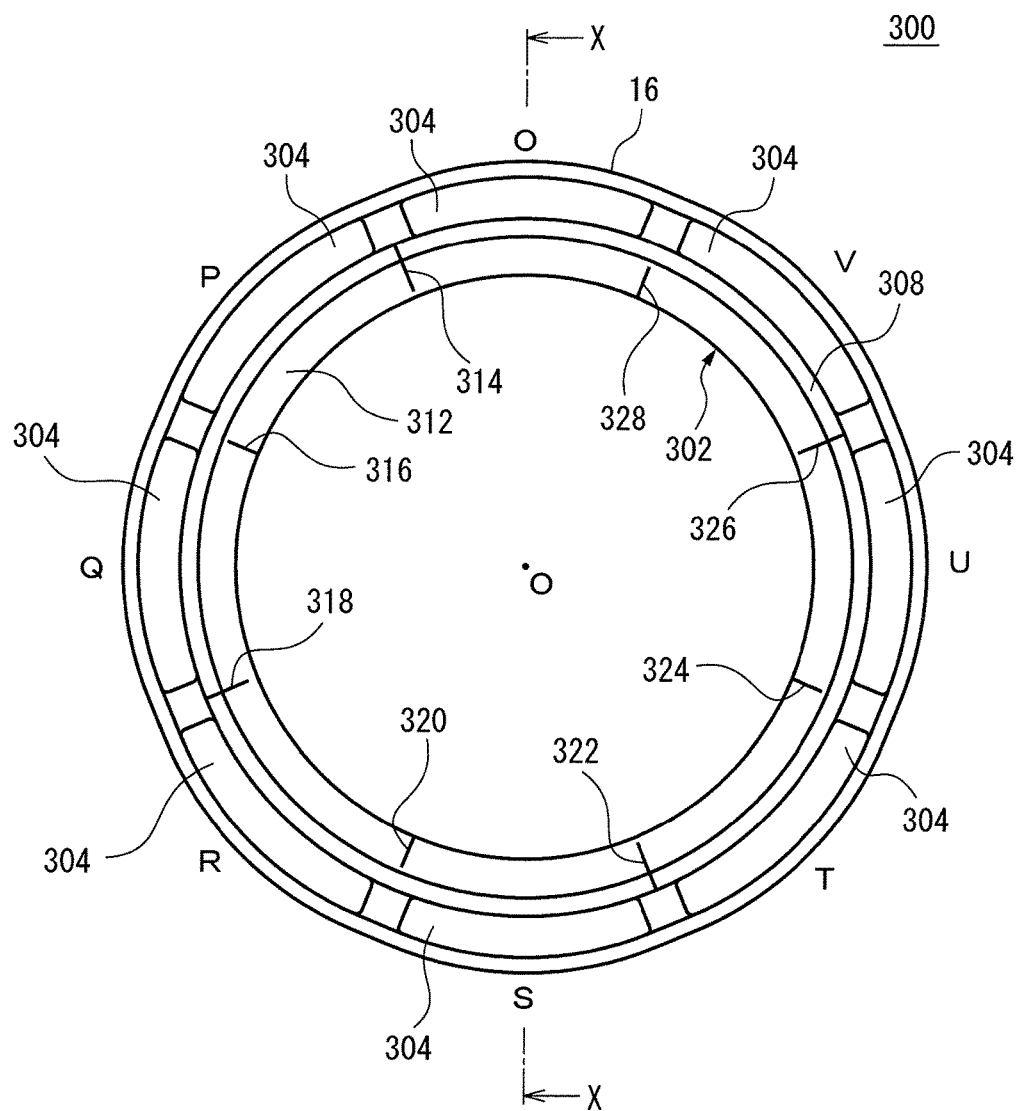
FIG. 9 is an appearance view of a rotor member according to another embodiment of the invention when seen from the front in the axial direction.
Figure 20:
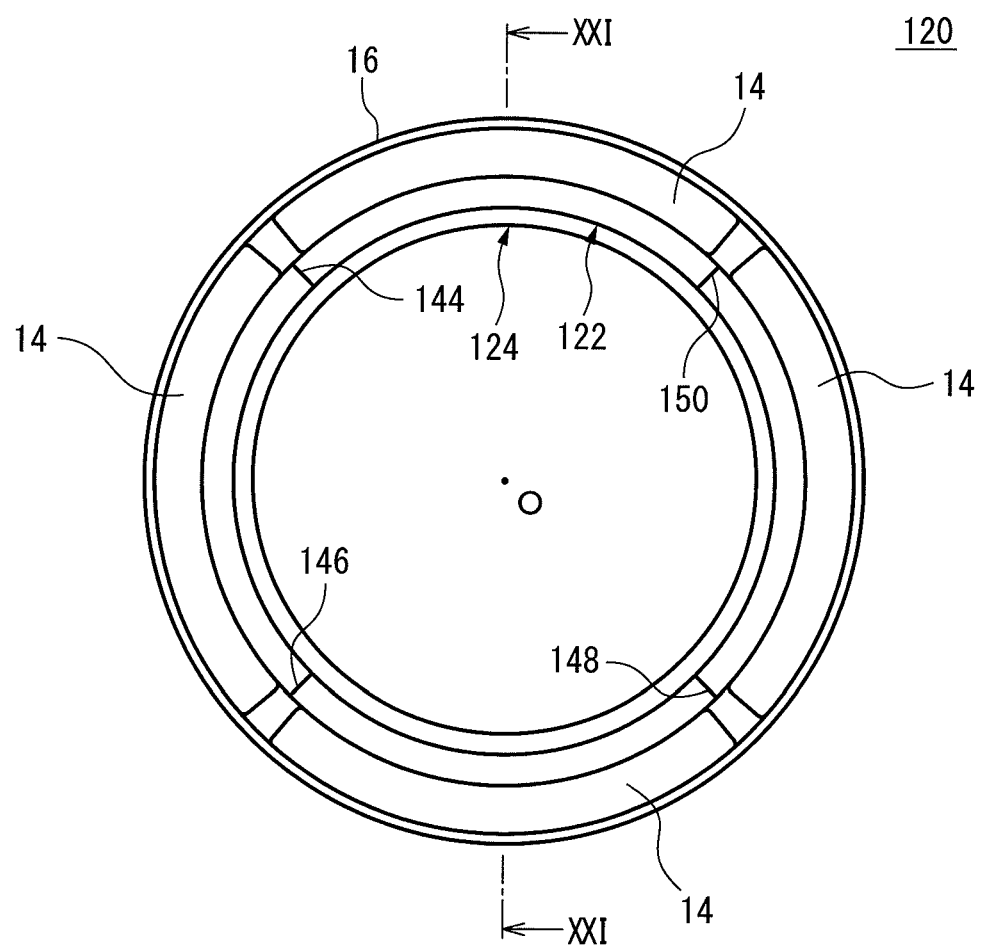
FIG. 20 is an appearance view of a rotor member according to still another embodiment of the invention when seen from the front in the axial direction.
Figure 21:
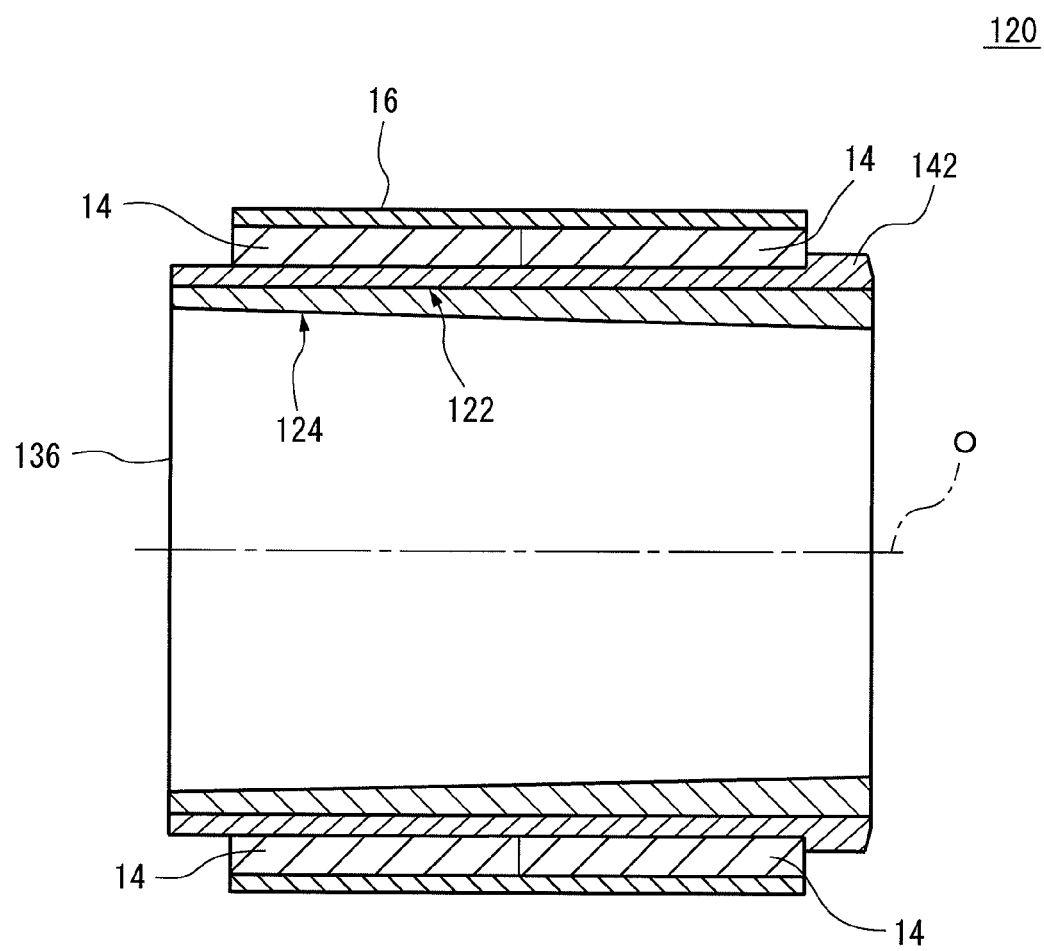
FIG. 21 is a cross sectional view of the rotor member shown in FIG. 20 cut along line XXI-XXI in FIG. 20.

The advantageous effect derived from the feature wherein the magnet mounting member can be easily deformed is also obtained in the case where the magnet mounting members 62, 82 shown in FIGS. 7 and 11 are applied to the rotor member 10 and where the rotor members 300, 210 and 120 shown in FIGS. 9, 14 and 20 are applied. For example, in the case where the magnet mounting member 62 is applied to the rotor member 10, the member 62 can easily deform due to the slits 72, 74, 76 and 78 when the magnet mounting member 62 receives force toward radially outside from the rotary shaft 182 during press-fitting the rotor member 10.

In addition, the slits 72, 74, 76 and 78 are provided with the gaps 72a, 74a, 76a and 78a having the widths in the circumferential direction, which can prevent the generation of friction at these slits 72, 74, 76 and 78 when the magnet mounting member 62 deforms. Due to this, the magnet mounting member 62 can more easily deform to radially outward. Furthermore, the elastic restoring force applied to the rotary shaft 182 from the magnet mounting member 62 when the magnet mounting member 62 is radially outwardly deformed becomes further smaller than that of the magnet mounting member 12.

Further, due to the holes 72b, 74b, 76b and 78b respectively formed at the rear ends of gaps 72a, 74a, 76a and 78a, it is possible to prevent generation of a stress concentration at the rear ends of the slits 72, 74, 76 and 78 when the magnet mounting member 62 is deformed. Whereby, it is possible to prevent the generation of cracks at the rear ends of the slits 72, 74, 76 and 78 of the magnet mounting member 62 during the operation of press-fitting the rotor member 10 to the rotary shaft 182.

On the other hand, regarding the magnet mounting member 82, since the magnet mounting member 82 is circumferentially divided at the slits 88, 90, 92 and 94, the magnet mounting member 82 can displace radially outward without exerting any reaction force, when it receives the force toward radially outside from the rotary shaft 182. In addition, the magnet mounting member 82 does not generate elastic restoring force applied to the rotary shaft 182 when it is moved radially outward.

Thus, in the case where the magnet mounting members 62, 82 are applied to the rotor member 10, it is possible to significantly reduce the force necessary for deforming the magnet mounting member 62, 82 when press-fitting the rotor member 10 to the rotary shaft 182. Accordingly, it is possible to fix the rotor member 10 to the rotary shaft 182 with smaller press force.

Further, in the case of manufacturing the rotor 280, the magnet mounting member 212 of the rotor 280 is circumferentially divided at the gaps 244, 246, 248, 250, 254, 256 and 258, similar to the above magnet mounting member 82. Therefore, it is possible to significantly reduce the force necessary for deforming the magnet mounting member 212 when press-fitting the rotor member 210 to the rotary shaft 282. Accordingly, it is possible to fix the rotor member 210 to the rotary shaft 282 with smaller press force.

Further, in the case of manufacturing the rotor member 280, since the segments 216 of the magnet mounting member 212 and the magnets 214 respectively include the flat outer peripheries 228 and flat inner peripheries 240, it is possible to make the machining operation for forming the segments 216 and the magnets 214 easier, whereby the manufacturing cost can be reduced.

Figure 36:
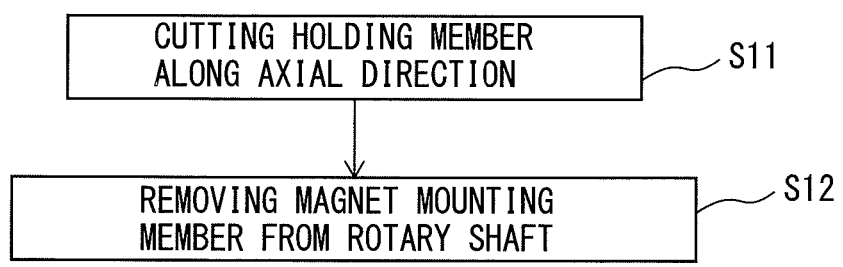
FIG. 36 is a flowchart of a method of disassembling a rotor, according to an embodiment of the invention.

Next, referring to FIG. 36, an example of a method of disassembling the rotor 180 will be described. At Step S11, the user cuts the holding member 16 along the axial direction at a position between the magnets 14 which adjoin each other in the circumferential direction. For example, if the holding member 16 is made of fiber, the user cuts a part of the holding member 16 along the axial direction, whereby the holding member 16 can be progressively broken from the initial cut point over the entire length in the axial direction thereof, by the action of a tensile strength generated at the holding member 16. In this way, the user can easily remove the holding member 16 from outer circumferences of the magnets 14.

At Step S12, the user pushes the second end 20 of the magnet mounting member 12 toward axially rearward so as to remove the magnet mounting member 12 from the rotary shaft 182. As described above, in the rotor 180, the elastic restoring force applied to the rotary shaft 182 form the magnet mounting member 12 becomes smaller due to the slits 28, 30, 32 and 34. Therefore, the user can easily remove the magnet mounting member 12 from the rotary shaft 182 with relatively small force.

Then, the user can disassemble the rotor 180 by removing the magnets 14 from the magnet mounting member 12. Thus, according to the present embodiment, the user can remove the magnets 14 and the magnet mounting member 12 from the rotor 180 by merely cutting the holding member 16, and can reuse them. As a result, it is possible to effectively utilize natural resources used in those components. This is especially beneficial for the case where a rare earth element such as neodymium, the production of which is limited to a certain degree, is used as a material for the magnet.

If the magnets 14 and the magnet mounting member 12 are fixed together by an adhesive, at Step S12, the user can collect the magnets 14 and the magnet mounting member 12 as a unitary component. In this case, this step S12 may include a step of separating the magnets 14 and the magnet mounting member 12 from each other by removing the adhesive with using e.g. a solvent. On the other hand, if magnets 14 and a magnet mounting member 12 are not fixed together by an adhesive, at Step S12, the user can separately collect the magnets 14 and the magnet mounting member 12.

Figure 37:
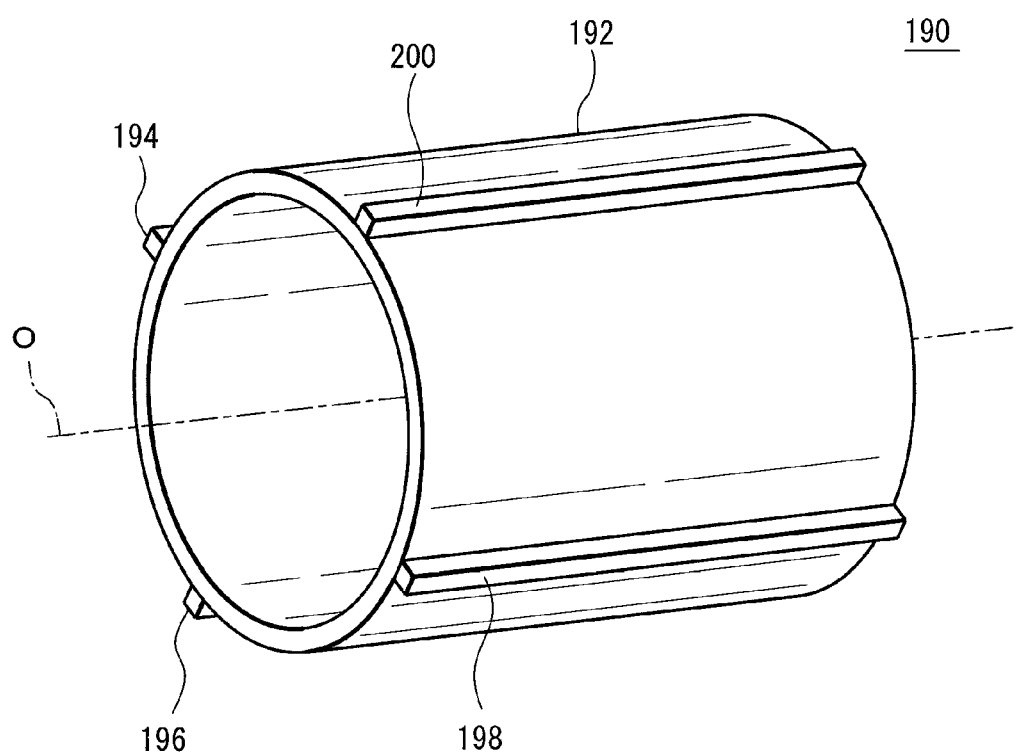
FIG. 37 is a perspective view of a part of a rotary shaft according to another embodiment of the invention.

The rotor may be further provided with a means for preventing the movement of the magnet mounting member in the circumferential direction relative to the rotary shaft. Next, referring to FIG. 37, a rotary shaft 190 provided with such a means will be described. Note that, in FIG. 37, only a part of the rotary shaft 190 extending in the axial direction is shown for easier understanding. In addition, leftward in FIG. 37 corresponds to axially frontward.

The rotary shaft 190 according to the embodiment is different from the above rotary shaft 182 in the following configuration. The rotary shaft 190 includes projections 194, 196, 198 and 200 projecting radially outward from the outer surface 192 of the rotary shaft 190. Each of the projections 194, 196, 198 and 200 extends straightly in the axial direction on the outer periphery 192 of the rotary shaft 190. The projections 194, 196, 198 and 200 are provided at positions corresponding to slits of a magnet mounting member that would be fixed to the rotary shaft 190 at radially outside thereof. In the present embodiment, a total of four projections 194, 196, 198 and 200 are arranged in the circumferential direction at regular intervals (i.e., 90° intervals).

Figure 8:
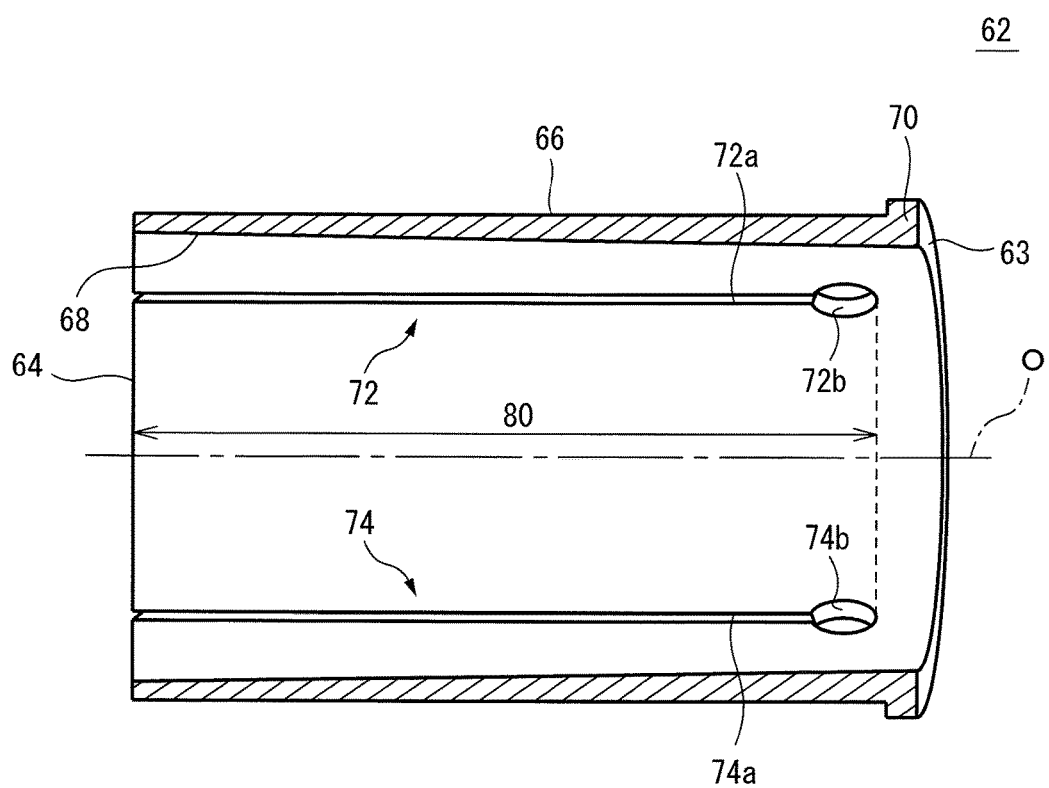
FIG. 8 is a cross sectional view of the magnet mounting member shown in FIG. 7 cut along line VIII-VIII in FIG. 7.

The projections 194, 196, 198 and 200 function as an element for guiding a magnet mounting member when the magnet mounting member is press-fitted to the rotary shaft 190. In addition, the projections 194, 196, 198 and 200 also function as an element for preventing the movement of the magnet mounting member relative to the rotary shaft 190 after the magnet mounting member is fixed to the rotary shaft 190. This function will be described below with an example where the magnet mounting member 62 shown in FIGS. 7 and 8 is fixed to the rotary shaft 190.

When the magnet mounting member 62 is press-fitted to the rotary shaft 190 from axially rear side, the magnet mounting member 62 is positioned relative to the rotary shaft 190 so that the positions of the axially front openings of the gaps 72*a*, 74*a*, 76*a* and 78*a* of the member 62 respectively match the positions of the projections 194, 196, 198 and 200 of the rotary shaft 190. Here, the widths in the circumferential direction of the gaps 72*a*, 74*a*, 76*a* and 78*a* are set to be equal to or slightly larger than the widths in the circumferential direction of the projections 194, 196, 198 and 200.

Then, the user press-fits the magnet mounting member 62 to the rotary shaft 190 by pushing the magnet mounting member 62 to axially frontward, whereby the projections 194, 196, 198 and 200 are received in the gaps 72*a*, 74*a*, 76*a* and 78*a*, and engage the walls which define the gaps 72*a*, 74*a*, 76*a* and 78*a*.

During press-fitting the magnet mounting member 62 to the rotary shaft 190, the projections 194, 196, 198 and 200 guide the magnet mounting member 62 to move straight toward axially forward, by engaging the gaps 72*a*, 74*a*, 76*a* and 78*a*. Due to this, it is possible to smoothly press-fit the magnet mounting member 62 to the rotary shaft 190.

After fixing the magnet mounting member 62 to a predetermined position, the projections 194, 196, 198 and 200 can prevent the circumferential movement of the magnet mounting member 62 relative to the rotary shaft 190 during the operation of the rotor, by engaging the gaps 72*a*, 74*a*, 76*a* and 78*a*.

In this way, the projections 194, 196, 198 and 200 function as a guide element for the magnet mounting member when press-fitting it to the rotary shaft 190, and also as a relative-movement-restriction element for preventing a relative movement of the magnet mounting member with respect to the rotary shaft 190.

The magnet mounting member described in the above-mentioned embodiment is provided with four slits. The number of the slits; however, is not restricted, and a single slit or any number of slits may be provided to the magnet mounting member. Furthermore, the slits in the embodiment are provided in a circumferential direction at regular intervals (specifically at 90° intervals). However, the slits may be provided to the magnet mounting member at any intervals in a circumferential direction.

According to the invention described above, the magnet mounting member is provided with the slits to cancel an interference of the magnet mounting member. Thus a press-fitting tonnage used for the interference is unneeded, thereby reducing a press-fitting tonnage used for assembling and thus allowing a production of a larger size of rotor. In addition, a rotor can be disassembled by merely removing a holding member, which makes it possible to readily reuse magnets, a magnet mounting member and a rotary shaft. Furthermore, a magnet mounting member provided with a tapered inner surface does not require a means to temporarily enlarge the inner periphery of the magnet mounting member by oil pressure when a rotor member is press fitted to a rotary shaft. This can simplify an assembling operation.

The embodiments described above should not be realized to restrict the scope of the invention described in the claims. Any embodiments combined with special features described in the embodiments of the invention can be included in the technical scope of the invention, though not all the combinations of the features are essential for solution to problem of the invention. Furthermore, it would be obvious to a person skilled in the art that various changes or improvements can be additionally applied to the embodiments described above.

Moreover, an order of movement, process, step, operation and procedure in a device, system, program and method described in the claims, description and drawings should be carried out in any sequence unless specified by the wordings of "before" and "prior to", etc. and unless specified that output of a prior processing is used in a following processing. The wordings of "first" and "next", etc. used for convenience in the claims, description and drawings to explain an operational flow do not necessarily mean to restrict an operational sequence in this order.

The invention claimed is:

1. A rotor member fixed to a rotary shaft of a rotary electric machine, comprising:
   a magnet mounting member having a first end at an axially first side and a second end at an axially second side;
   a plurality of magnets arranged radially outside of the magnet mounting member; and
   a tubular holding member arranged radially outside of the plurality of magnets so as to surround the plurality of magnets, wherein
   the magnet mounting member includes a slit extending through the magnet mounting member in the radial direction, the slit extending over a predetermined axial-direction section which includes at least one of the first end and the second end, wherein the magnet mounting member includes a tapered inner periphery which continuously expands radially outward as extending from the axially first side to the axially second side.

2. The rotor member according to claim 1, wherein the slit is arranged at a position between the magnets which adjoin each other in the circumferential direction.

3. The rotor member according to claim 1, wherein the plurality of magnets is arranged within the axial-direction section.

4. The rotor member according to claim 1, wherein a plurality of the slits are arranged in a circumferential direction.

5. The rotor member according to claim 1, wherein the holding member includes:
   fiber selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers; or fiber-reinforced resin with fiber selected from a group of carbon fiber, glass fiber, aramid fiber, silicon carbide fiber, boron fiber, titanium alloy fiber, ultra-high molecular weight polyethylene, polybutylene terephthalate fiber, and a combination of two or more of these fibers.

6. A rotor member fixed to a rotary shaft of a rotary electric machine, comprising:
- a magnet mounting member having a first end at an axially first side and a second end at an axially second side;
- a plurality of magnets arranged radially outside of the magnet mounting member; and
- a tubular holding member arranged radially outside of the plurality of magnets so as to surround the plurality of magnets, wherein
- the magnet mounting member includes a slit extending through the magnet mounting member in the radial direction, the slit extending over a predetermined axial-direction section which includes at least one of the first end and the second end, wherein the slit extends over the axial-direction section which includes the second end and which excludes the first end.

7. A rotor comprising:
- a rotary shaft; and
- a rotor member fixed to the rotary shaft of a rotary electric machine, comprising:
  - a magnet mounting member having a first end at an axially first side and a second end at an axially second side;
  - a plurality of magnets arranged radially outside of the magnet mounting member; and
  - a tubular holding member arranged radially outside of the plurality of magnets so as to surround the plurality of magnets, wherein
  - the magnet mounting member includes a slit extending through the magnet mounting member in the radial direction, the slit extending over a predetermined axial-direction section which includes at least one of the first end and the second end, wherein,
  - the rotary shaft includes a tapered outer circumferential surface which continuously expands radially outward as extending from the axially first side to the axially second side within an axial-direction section where the rotor member is fixed,
  - the magnet mounting member is arranged at the outer periphery of the rotary shaft,
  - the magnet mounting member and the plurality of magnets are pressed radially outward by the rotary shaft, and held between the rotary shaft and the holding member by the action of an elastic restoring force toward radially inside which is generated at the holding member.

8. A rotary electric machine comprising a rotor according to claim 7.

* * * * *